(12) United States Patent
Gupta et al.

(10) Patent No.: US 9,672,064 B2
(45) Date of Patent: Jun. 6, 2017

(54) DYNAMICALLY ADAPTIVE, RESOURCE AWARE SYSTEM AND METHOD FOR SCHEDULING

(71) Applicant: Palo Alto Research Center Incorporated, Palo Alto, CA (US)

(72) Inventors: Shekhar Gupta, Mountain View, CA (US); Christian Fritz, Menlo Park, CA (US); Johan de Kleer, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/797,547

(22) Filed: Jul. 13, 2015

(65) Prior Publication Data

US 2017/0017521 A1   Jan. 19, 2017

(51) Int. Cl.
  *G06F 9/46*    (2006.01)
  *G06F 15/173*  (2006.01)
  *G06F 9/48*    (2006.01)
  *G06F 9/50*    (2006.01)

(52) U.S. Cl.
  CPC ............. *G06F 9/48* (2013.01); *G06F 9/4806* (2013.01); *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5038* (2013.01); *G06F 9/5044* (2013.01); *G06F 9/5055* (2013.01); *G06F 9/5061* (2013.01); *G06F 9/5072* (2013.01)

(58) Field of Classification Search
  None
  See application file for complete search history.

(56) References Cited

U.S. PATENT DOCUMENTS

| 2006/0010449 | A1* | 1/2006 | Flower | G06F 9/5033 718/102 |
| 2006/0020939 | A1* | 1/2006 | Fellenstein | G06F 9/4843 718/1 |
| 2008/0222642 | A1* | 9/2008 | Kakarla | G06F 9/5077 718/104 |
| 2009/0222543 | A1* | 9/2009 | Tannenbaum | G06F 9/5072 709/222 |

(Continued)

OTHER PUBLICATIONS

"Hadoop: Capacity Scheduler," Apache Hadoop 2.7.1—Hadoop: Capacity Scheduler, https://hadoop.apache.org/docs/current/hadoop-yarn/hadoop-yarn-site/CapacityScheduler.html, accessed Aug. 19, 2015, 5 pages.

(Continued)

*Primary Examiner* — Charles Swift
(74) *Attorney, Agent, or Firm* — Fay Sharpe LLP

(57) ABSTRACT

The following relates generally to computer system efficiency improvements. Broadly, systems and methods are disclosed that improve efficiency in a cluster of nodes by efficient processing of tasks among nodes in the cluster of nodes. Assignment of tasks to compute nodes may be based on learned CPU capabilities and I/O bandwidth capabilities of the compute nodes in the cluster.

12 Claims, 14 Drawing Sheets

(56) References Cited

U.S. PATENT DOCUMENTS

| | | | | |
|---|---|---|---|---|
| 2010/0235844 | A1* | 9/2010 | Arwe | G06F 9/50 718/104 |
| 2010/0287019 | A1* | 11/2010 | Guo | G06F 11/3442 709/224 |
| 2010/0333092 | A1* | 12/2010 | Stefansson | G06F 9/44505 718/100 |
| 2013/0232192 | A1* | 9/2013 | Kawagata | H04L 67/42 709/203 |
| 2014/0012991 | A1* | 1/2014 | Wang | G06F 9/505 709/226 |
| 2014/0229221 | A1* | 8/2014 | Shih | G06Q 10/06313 705/7.23 |
| 2014/0289733 | A1 | 9/2014 | Fritz et al. | |
| 2015/0200867 | A1* | 7/2015 | Dutta | H04L 49/3045 709/226 |
| 2015/0215426 | A1* | 7/2015 | Torii | H04L 67/32 709/201 |
| 2015/0304411 | A1* | 10/2015 | Cheng | H04L 67/16 709/203 |
| 2016/0085587 | A1* | 3/2016 | Dube | G06F 9/5011 718/104 |

OTHER PUBLICATIONS

"Hadoop: Fair Scheduler," Apache Hadoop 2.7.1—Hadoop: Fair Scheduler, https://hadoop.apache.org/docs/current/hadoop-yarn/hadoop-yarn-site/FairScheduler.html, accessed Aug. 19, 2015, 7 pages.

Balakrishnan et al., "The Impact of Performance Asymmetry in Emerging Multicore Architectures," In Proceedings of the 32nd Annual International Symposium on Computer Architecture (2005), 12 pages.

Blagodurov et al., "Contention-Aware Scheduling on Multicore Systems," ACM Transactions on Computer Systems, vol. 28, No. 4, Article 8, Dec. 2010, 45 pages.

Chang et al., "Scheduling in MapReduce-like Systems for Fast Completion Time," 2011, INFOCOM [5], 9 pages.

Chen et al., "The Case for Evaluating MapReduce Performance Using Workload Suites," 2011 IEEE 19th International Symposium on Modeling, Analysis Simulation of Computer and Telecommunication Systems (MASCOTS), Jul. 2011, 10 pages.

Dean et al., "MapReduce: Simplified Data Processing on Large Clusters," Commun. ACM 51, 1, Jan. 2008, 13 pages.

Ghemawat et al., "The google file system," 2003, 15 pages.

Ghiasi et al., "Scheduling for Heterogeneous Processors in Server Systems," Proceedings of the 2nd conference on Computing frontiers (New York, NY, USA, 2005), CF '05, ACM, 12 pages.

Ghodsi et al., "Dominant Resource Fairness: Fair Allocation of Multiple Resource Types," Proceedings of the 8th USENIX Conference on Networked Systems Design and Implementation (Berkeley, CA, USA, 2011), NSDI '11, USENIX Association, 14 pages.

Herodotou, "Hadoop Performance Models," CoRR abs/1106.0940, 2011, 19 pages.

Hindman et al., "Mesos: A Platform for Fine-Grained Resource Sharing in the Data Center," Proceedings of the 8th USENIX Conference on Networked Systems Design and Implementation (Berkeley, CA, USA, 2011), NSDI'11, USENIX Association, 14 pages.

Hood et al., "Performance Impact of Resource Contention in Multicore Systems," 2010 IEEE International Symposium on Parallel Distributed Processing (IPDPS), Apr. 2010, 12 pages.

Kumar K et al., "CASH: Context Aware Scheduler for Hadoop," Proceedings of the International Conference on Advances in Computing, Communications and Informatics (New York, NY, USA, 2012), ICACCI '12, ACM, 10 pages.

Kumar et al., "Heterogeneous Chip Multiprocessors," Computer 38, 11, Nov. 2005, 7 pages.

Lu et al., "Non-intrusive Slot Layering in Hadoop," 2013 13th IEEE/ACM International Symposium on Cluster, Cloud and Grid Computing (CCGrid), May 2013, 8 pages.

Polo et al., "Resource-aware Adaptive Scheduling for MapReduce Clusters," Middleware (2011), F. Kon and A.-M. Kermarrec, Eds., vol. 7049 of Lecture Notes in Computer Science, Springer, 20 pages.

R Core Team, "R: A Language and Environment for Statistical Computing," R Foundation for Statistical Computing, Vienna, Austria, 2013, 3454 pages.

Sharma et al., "MROrchestrator: A Fine-Grained Resource Orchestration Framework for MapReduce Clusters," 2012 IEEE 5th International Conference on Cloud Computing (CLOUD), Jun. 2012, 8 pages.

Tang et al., "Dynamic MR: A Dynamic Slot Allocation Technique for MapReduce Clusters," 2013 IEEE International Conference on Cluster Computing (CLUSTER), Sep. 2013, 14 pages.

Vavilapalli et al., "Apache Hadoop YARN: Yet Another Resource Negotiator," Proceedings of the 4th Annual Symposium on Cloud Computing (New York, NY, USA, 2013), SOCC '13, ACM, 16 pages.

Zaharia et al., "Improving MapReduce Performance in Heterogeneous Environments," Proceedings of the 8th USENIX Symposium on Operating Systems Design and Implementation (Berkeley, CA, USA, 2008), OSDI '08, USENIX Association, 14 pages.

Zhuravlev et al., "Addressing Shared Resource Contention in Multicore Processors via Scheduling," Proceedings of the Fifteenth Edition of ASPWS on Architectural Support for Programming Languages and Operating Systems (New York, NY, USA, 2010), ASPLOS XV, ACM, 13 pages.

* cited by examiner

DYNAMICALLY ADAPTIVE, RESOURCE AWARE SYSTEM AND METHOD FOR SCHEDULING

BACKGROUND

The present application relates generally to improving the throughput of a multi-server processing system. It finds particular application in conjunction with task scheduling in distributed compute systems using a map-reduce framework, and will be described with particular reference thereto. However, it is to be appreciated that the present application is also amenable to other like applications.

Map-reduce frameworks are a key technology for implementing big data applications. In these frameworks, a computational job is broken down into map and reduce tasks. The tasks are then allocated to a set of nodes (e.g., servers) so the tasks can be done in parallel. A map task processes a data block and generates a result for this block. A reduce task takes all these intermediate mapping results and combines them into the final result of the job.

A popular map-reduce framework is HADOOP® (registered TM of Apache Software Foundation). HADOOP® comprises a storage solution known as HADOOP® Distributed File System (HDFS), which is an open source implementation of the Google File System (GFS). HDFS is able to store large files across several machines, and using MapReduce, such files can be processed in a distributed fashion, moving the computation to the data, rather than the data to the computation. An increasing number of so called "big data" applications, including social network analysis, genome sequencing, and fraud detection in financial transaction data, require horizontally scalable solutions, and have demonstrated the limits of relational databases.

A HADOOP® cluster includes a NameNode (e.g. a node that keeps the directory tree of all files in the file system, and tracks where across the cluster the file data is kept but does not store the data itself) and many DataNodes (e.g., a node that stores data). When a file is copied into the cluster, it is divided into blocks, for example, of 64 megabytes (MBs). Each block is stored on three or more DataNodes depending on the replication policy of the cluster, as shown in FIG. 1. Once the data is loaded, computational jobs can be executed over it. New jobs are submitted to the NameNode, where map and reduce tasks are scheduled onto the DataNodes, as shown in FIG. 2.

This is illustrated at a high level in FIG. 3. With reference thereto, NameNode 310 splits a job 330 into tasks 340. The tasks 340 are then assigned to individual DataNodes 320. There may be a multitude of DataNodes 320, and, in one embodiment, the multitude of DataNodes is in the range of a 10-1000s of DataNodes.

A map task processes one block and generates a result for this block, which gets written back to the storage solution. The NameNode will schedule one map task for each block of the data, and it will do so by selecting one of the three DataNodes that are storing a copy of that block to avoid moving large amounts of data over the network. A reduce task takes all these intermediate mapping results and combines them into the final result of the job.

One challenge with map-reduce frameworks, such as HADOOP®, is that most frameworks assume a homogeneous cluster of nodes (i.e., that all compute nodes in the cluster have the same hardware and software configuration) and assign tasks to servers regardless of their capabilities. However, heterogeneous clusters are prevalent. As nodes fail, they are typically replaced with newer hardware. Further, research has shown benefits to heterogeneous clusters, as compared to homogeneous clusters (see, e.g., Saisanthosh Balakrishnan, Ravi Rajwar, Mike Upton, and Konrad Lai. 2005. The Impact of Performance Asymmetry in Emerging Multicore Architectures. In *Proceedings of the* 32*nd annual international symposium on Computer Architecture* (ISCA '05). IEEE Computer Society, Washington, D.C., USA, 506-517). Intuitively, more specialized hardware can better suit a variety of differing job resource profiles. By failing to account for heterogeneity, known map-reduce frameworks are not able to match jobs to the best compute nodes, consequently compromising global metrics, such as throughput or maximum delay.

Matei Zaharia, Andy Konwinski, Anthony D. Joseph, Randy Katz, and Ion Stoica. 2008. Improving MapReduce performance in heterogeneous environments. In *Proceedings of the* 8*th USENIX conference on Operating systems design and implementation* (OSDI'08). USENIX Association, Berkeley, Calif., USA, 29-42, investigates scheduling issues in heterogeneous clusters. However, it does not characterize HADOOP® jobs, but rather proposes a scheduling strategy that speculatively executes tasks redundantly for tasks that are projected to run longer than any other.

Further, while tasks belonging to the same job are very similar to each other in terms of their individual resource profile, tasks belonging to different jobs can have very different profiles in terms of their resource requirements (e.g. differing in the degree to which they utilize a central processing unit (CPU), memory, disk input/output (I/O) or network I/O or so forth). Jobs may also have certain service level requirements. Known map-reduce frameworks do not efficiently schedule tasks to satisfy service level requirements while optimally utilizing available resources.

The present application provides a new and improved system and method which overcome the above-referenced problems and others.

INCORPORATION BY REFERENCE

U.S. Patent Application Publication No. 2014/0289733 A1 (System and Method for Efficient Task Scheduling in Heterogeneous, Distributed Compute Infrastructures Via Pervasive Diagnosis) is hereby incorporated by reference in its entirety.

BRIEF DESCRIPTION

In accordance with one aspect of the present application, a system for scheduling jobs in a cluster of compute nodes is provided. The system includes a plurality of interconnected compute nodes defining a cluster of compute nodes, the cluster including a NameNode and a multitude of DataNodes. The NameNode may include at least one processor which may be programmed to learn central processing unit (CPU) capabilities and disk input/output (I/O) bandwidth capabilities of compute nodes in the cluster; and schedule execution of a plurality of tasks on DataNodesof the cluster based on the learned CPU capabilities and I/O bandwidth capabilities of the cluster.

In the system as described in the preceding paragraph, the learning may be performed during an offline training phase. The learning may be completed before bringing the cluster online. An optimal number of containers may be determined for compute nodes in the cluster; and the scheduling may be further based on the determined optimal numbers. The determination may be based on resource requirements of applications and capabilities of compute nodes in the cluster.

The optimal number of containers may be at least in part determined by use of the equation:

$$X_k^* = \frac{\text{argmax}}{x_k} \Sigma_i \frac{x_{ki}}{\rho(\theta^j, \pi^k, L^k)};$$

where $X_k^*$ denotes a vector of containers, $\rho$ denotes a predicted task completion time, $\theta^j$ denotes a resource requirement, $\pi^k$ denotes a resource capability, and $L^k$ denotes a load on a node. The execution of a plurality of tasks may be scheduled such that a throughput of the cluster is increased; and the throughput may be determined based on sizes of tasks of the plurality of tasks.

In another aspect, a method for scheduling jobs in a cluster of compute nodes including a NameNode and a multitude of DataNodes is provided. The method may include learning central processing unit (CPU) capabilities and disk input/output (I/O) bandwidth capabilities of compute nodes in the cluster; and scheduling execution of a plurality of tasks on DataNodes of the cluster based on the learned CPU capabilities and I/O bandwidth capabilities of compute nodes of the cluster.

In yet another aspect, a system for scheduling jobs may include a plurality of interconnected compute nodes defining a cluster of compute nodes, the cluster including a NameNode and a DataNode. The system may further include at least one processor programmed to predict a relative resource usage of map tasks by observing a resource usage of a first map task; automatically train an adjustable system of task completion time; learn central processing unit (CPU) capabilities and disk input/output (I/O) bandwidth capabilities of compute nodes in the cluster; and schedule execution of a plurality of tasks on compute nodes of the cluster based on the learned CPU capabilities and I/O bandwidth capabilities of compute nodes of the cluster.

DETAILED DESCRIPTION

Figure 1:
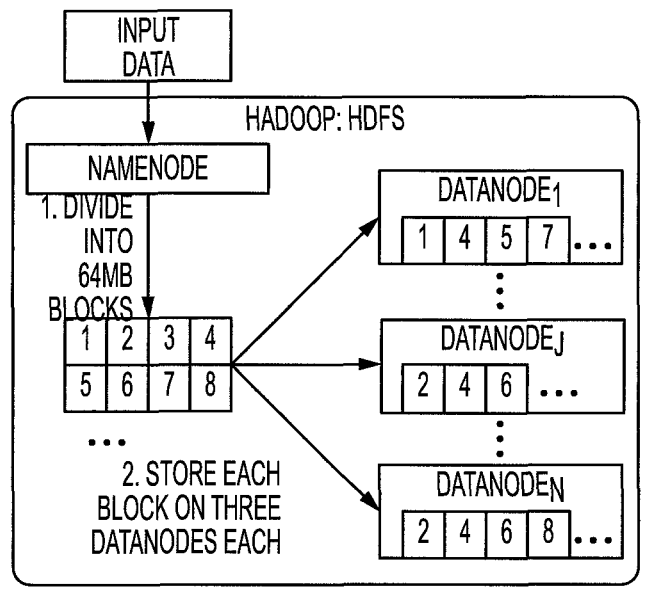
FIG. 1 illustrates the HADOOP® Distributed File System (HDFS).

The approaches described herein improve the technical functioning of a cluster of nodes by improving efficiency in utilization of available resources. In particular, the approaches described herein advantageously improve CPU usage and disk I/O bandwidth optimization of a compute node (e.g. a server). The decision on how to use resources, for example, which tasks to execute on which node, is made by a scheduler. Several performance metrics may be used to show this improved technical functioning, and one of the more important ones is throughput. High throughout advantageously effects time to completion for a given set of applications running on the cluster, and improves the computer by improving efficiency of the system, which for example may lower the amount of memory needed.

But, maximizing throughput is challenging for at least two reasons. First, for newly submitted applications, it is unknown what their actual runtime resource requirements are, for example, what fraction of the available bandwidth of a resource a task will utilize on average (e.g., share of CPU time, disk I/O bandwidth). Second, even if these resource requirements can be discovered, it is not immediately obvious which combination of tasks running on a given node would maximize throughput. These challenges are not met by existing HADOOP® schedulers, leaving room for improvement in terms of throughput. The current approach for solving this problem is sub-optimal: they require the cluster to be configured in terms of the number of containers (e.g. basic units of processing capacity) to schedule on a node (explained below), and then use this configuration independent of actual resource requirements of tasks. This leads to both under-utilization of available resources, for instance when all tasks running on a node are CPU-bound, while the node's disks are idle, as well as reduced performance due to over-subscription of select resources, for instance when running multiple tasks that all perform a significant amount of disk I/O on the same node. This happens, because regardless of task-specific requirements, existing schedulers pretend that every task requires a fixed number of CPU cores and a specific, fixed amount of RAM (usually 1 GB).

The approaches described herein improve system throughput and reduce the need to optimally configure the cluster by solving the two challenges described above. In this regard, the approaches (e.g. by use of the dynamically adaptive, resource aware scheduler—"DARA"): 1) discover the resource requirements of map tasks by observing the resource usage of the first map task of an application executing on the cluster, and apply a conversion scheme defined in order to turn this information into or create a prediction of a measure of relative average resource usage per unit of time (since all map tasks of an application typically have comparable resource requirements, this information may be used to improve scheduling); and 2) present a model of task completion time for tasks whose parameters can be trained automatically on data obtained from offline experiments for a node. The trained model can be adjusted for a newly submitted application only based on data obtained from the application's first completed task. This task can be executed on any machine in the cluster, not necessarily the node in question. This allows for the solving of the problem of determining optimal combinations of tasks to run on a given node.

Figure 4:
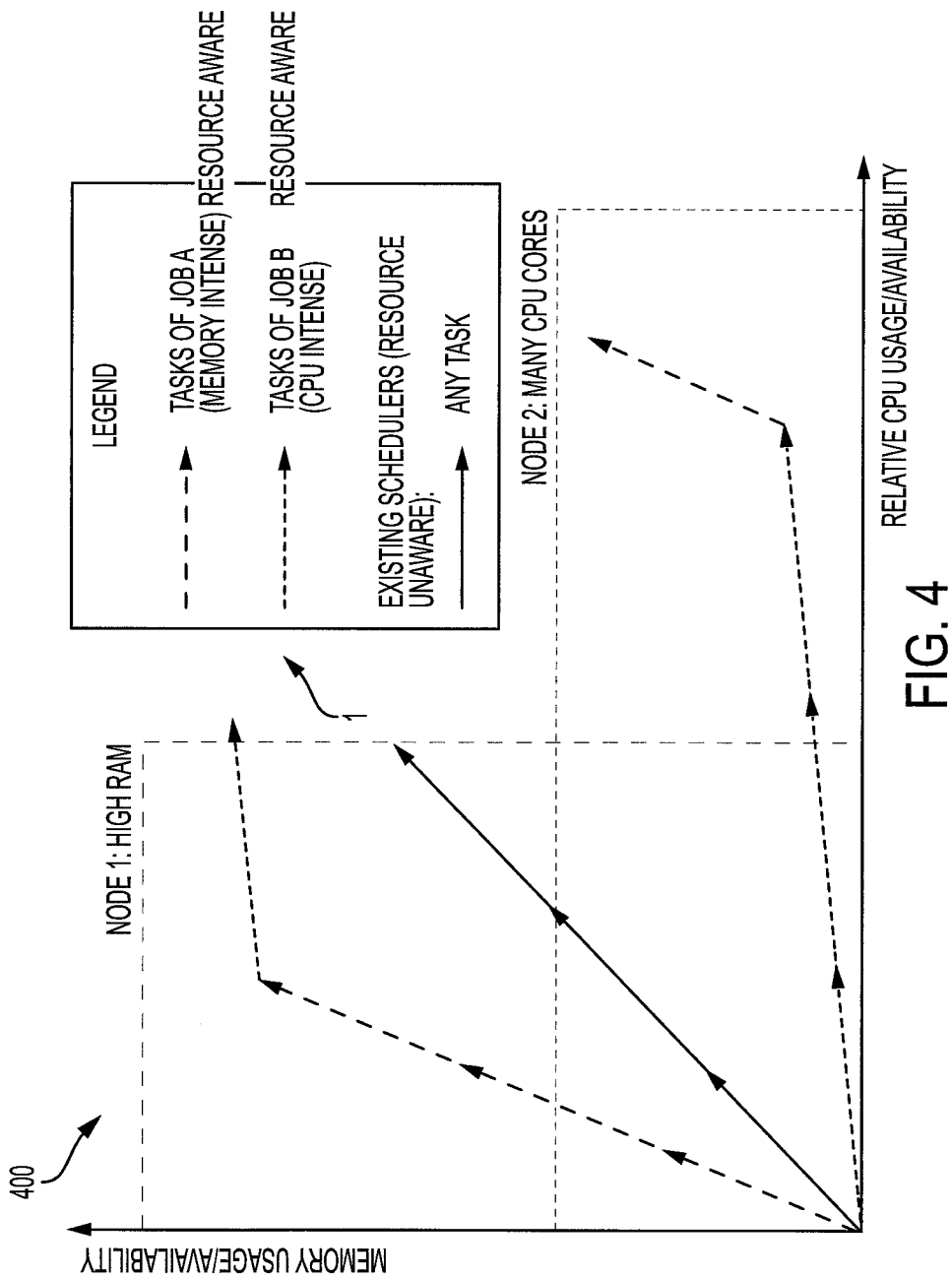
FIG. 4 shows a comparison of tasks scheduled by a resource aware schedule verses tasks scheduled by a resource unaware scheduler.

The graph 400 of FIG. 4 shows aspects and advantages of efficiency gains. With reference thereto, it is advantageous for a system to "stay out of" quadrant 1. Thus, it can be seen that the tasks of jobs A and B (which are resource aware) are advantageous over the existing schedulers (which are resource unaware).

Compared to previous algorithms, the approaches described herein improve throughput and workload execution. For example, the approaches described herein improve throughput up to 50% compared to (previously-known) Capacity-scheduler and 55% compared to (previously-known) Fair-scheduler. And, the approaches described herein speed up the workload execution up to 1.5 times compared to Capacity-scheduler and 1.55 compared to Fair-scheduler.

The performance gains are due at least in part to a better utilization of concurrent resources (e.g., disk and CPU, multiple CPU core) while carefully avoiding over-subscription. For instance, mixing CPU-intense tasks with disk-intense tasks will achieve better throughput than putting CPU-intense tasks with other CPU-intense tasks, and disk-intense tasks with other disk-intense tasks. Likewise, the methods described herein can account for heterogeneity in available cluster resources, e.g., by automatically assigning disk-intense tasks to nodes with fast solid-state disks, if available and possible without reducing benefits of data-locality.

Scheduling in HADOOP® version 2 is done by a ResourceManager which runs on a single master node. For incoming applications, the ResourceManager starts an ApplicationMaster on one of a group of slave nodes. The ApplicationMaster makes resource requests to the ResourceManager and is also responsible for monitoring the status of the job. Applications are divided into tasks and for every task the scheduler assigns a container on a node in the cluster. These containers are managed and monitored by the NodeManager, running on each slave node. A container is the basic unit of processing capacity in HADOOP® version 2, and is an encapsulation of resources.

In the current schedulers, containers only consider memory and CPU cores. The existing HADOOP® schedulers allocate containers based on the available resources on nodes, but do not take the actual resource requirements of applications into account. Instead, they assume the same requirements for each task (typically, 1 CPU core, and 1 GB of memory). Therefore, on any given node, the same number of containers will be allocated, i.e., the same number of tasks will execute in parallel.

On the other hand, HADOOP® version 2 allows the administrator to specify the amount of RAM and number of cores of each node in the cluster and uses this information to allocate containers on nodes, i.e., assign tasks. However, YARN ("yet another resource negotiator"—part of HADOOP® version 2) does not guarantee that such kind of resource allocation is optimal in terms of performance because the actual resource requirements of applications are not taken into account—nor are they known. Instead, the existing HADOOP® schedulers use the following formulae to determine the number of containers to assign to a node where ContainerMemorySize is the configured, fixed amount of memory (typically 1 GB or 512 MB) allocated for a container, and #Cores is the number of CPU cores on the node:

$$\text{\#Containers} = \min\left\{\frac{TotalMemory}{ContainerMemorySize}, \text{\#Cores}\right\} \quad (1)$$

This formula disregards the actual use of memory, and ignores the actual percentage of time the task uses the CPU as well as other resources such as disk I/O.

Measuring the actual resource requirements of a task is not easy. While peak memory usage is reported by the operating system, estimating the relative load of a task on the CPU and on the bandwidth of disk I/O is not straightforward. What is measurable, however, is the total use of these resources over the duration of the task, e.g., total CPU time in seconds, and the total number of bytes written and read to and from disk. These values and their ratio vary significantly depending on the application as seen in Table 1 for a set of standard HADOOP® benchmark applications. The values in Table 1 were obtained from the operating system (Linux) via a slight modification to the NodeManager.

TABLE 1

Per task resource requirements of HADOOP ® benchmark applications.

| Application | CPU Time (Sec) | RAM (MB) | Disk I/O (MB) |
| --- | --- | --- | --- |
| Pi (1000 Samples) | 10 | 230 | 5 |
| Sort (120 GB) | 10 | 280 | 250 |
| WordCount (60 GB) | 30 | 300 | 150 |
| RandomWriter (120 GB) | 20 | 140 | 1024 |
| AggregateWordCount (60 GB) | 5 | 280 | 120 |

Values such as the values in Table 1 can be used to estimate the relative load a task puts on resources. While the absolute value of these metrics only describe the size of the job and directly contribute to the overall running time of a task, their relative value provides insight into their relative, concurrent resource requirements. For instance, in the example of Table 1, Pi is evidently more CPU intensive than Sort or RandomWriter, both of which are more disk intensive; and WordCount is balanced.

Existing schedulers create containers that assume a task independent, fixed memory usage, typically 1 GB. As can be seen from Table 1, this overly conservative. For instance, when running Pi allocating only two containers on a node with two GB of RAM and 16 CPU cores would mean an underutilization of resources.

Figure 5:
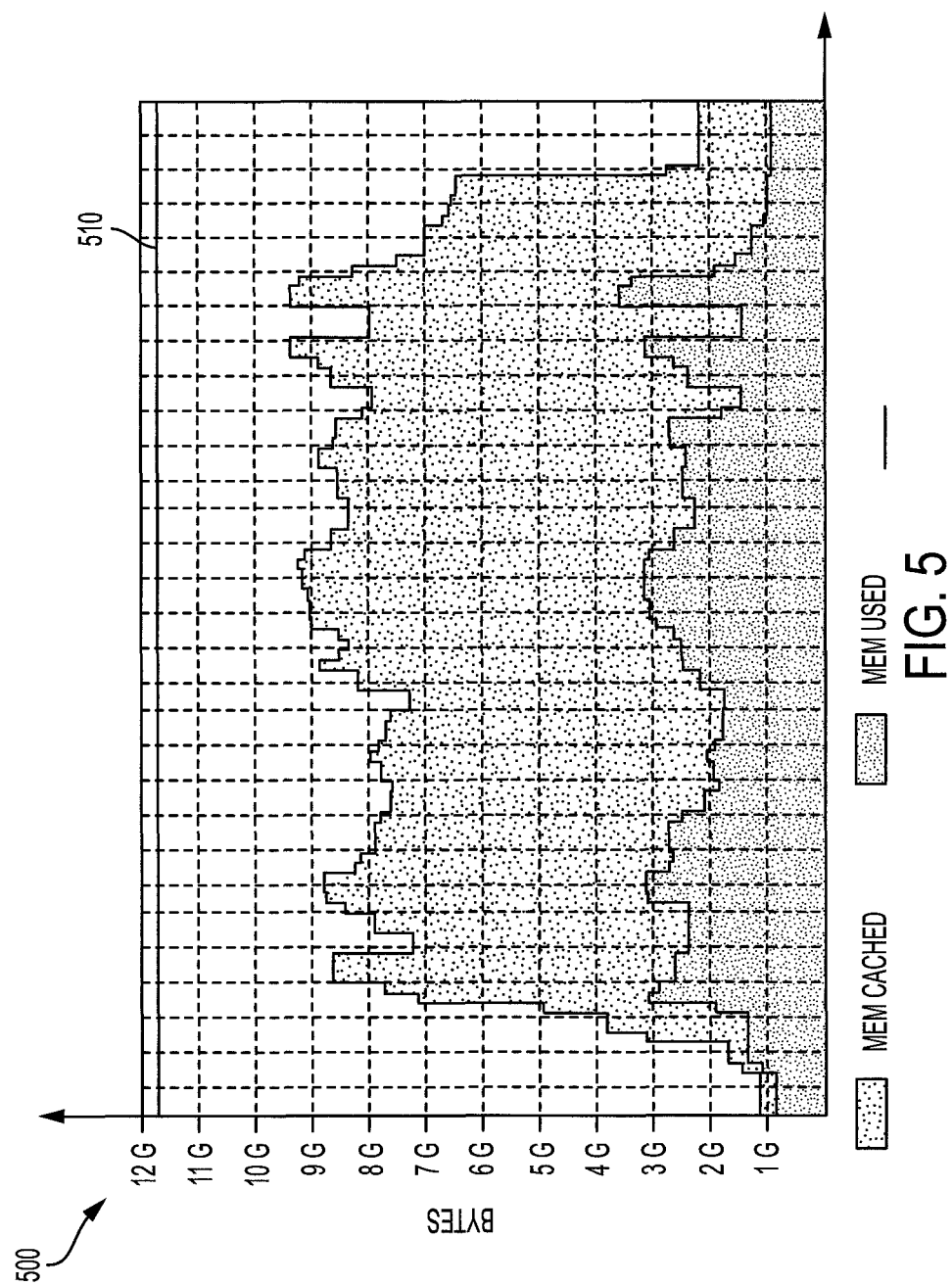
FIG. 5 shows an aspect of memory usage of a node in the cluster when running 12 Pi and 6 Sort tasks.

For verification, 12 tasks of Pi and 6 tasks of Sort on a node with 12 GB of RAM were run. Note that this is already more than the 12 containers that existing schedulers would allocate. The graph 500 of FIG. 5 shows an example of memory usage on that node, including total in-core memory 510. Running these 18 tasks in parallel does not cause a memory bottleneck. During the entire execution of these two applications, the memory usage was sufficiently lower than of the total memory on the node. Hence, allocating even 18 tasks is overly conservative in this case.

Likewise, if a task actually uses more than the amount of RAM configured for containers, for example 2 GB instead of 1 GB, then the opposite will happen and performance will degrade due to an over-subscription of available RAM.

In Equation (1) (previously set out), the number of containers is limited by available CPU cores. Limiting the number of containers by the number of cores avoids CPU bottlenecks which would increase the completion time of tasks. However, running more tasks on a node would increase the number of completed tasks. There is thus a trade-off in multi-processor scheduling in determining the optimal number of concurrent processes to run. An optimal number in this trade-off may depend heavily on the relative use of a CPU core by processes.

Figure 6:
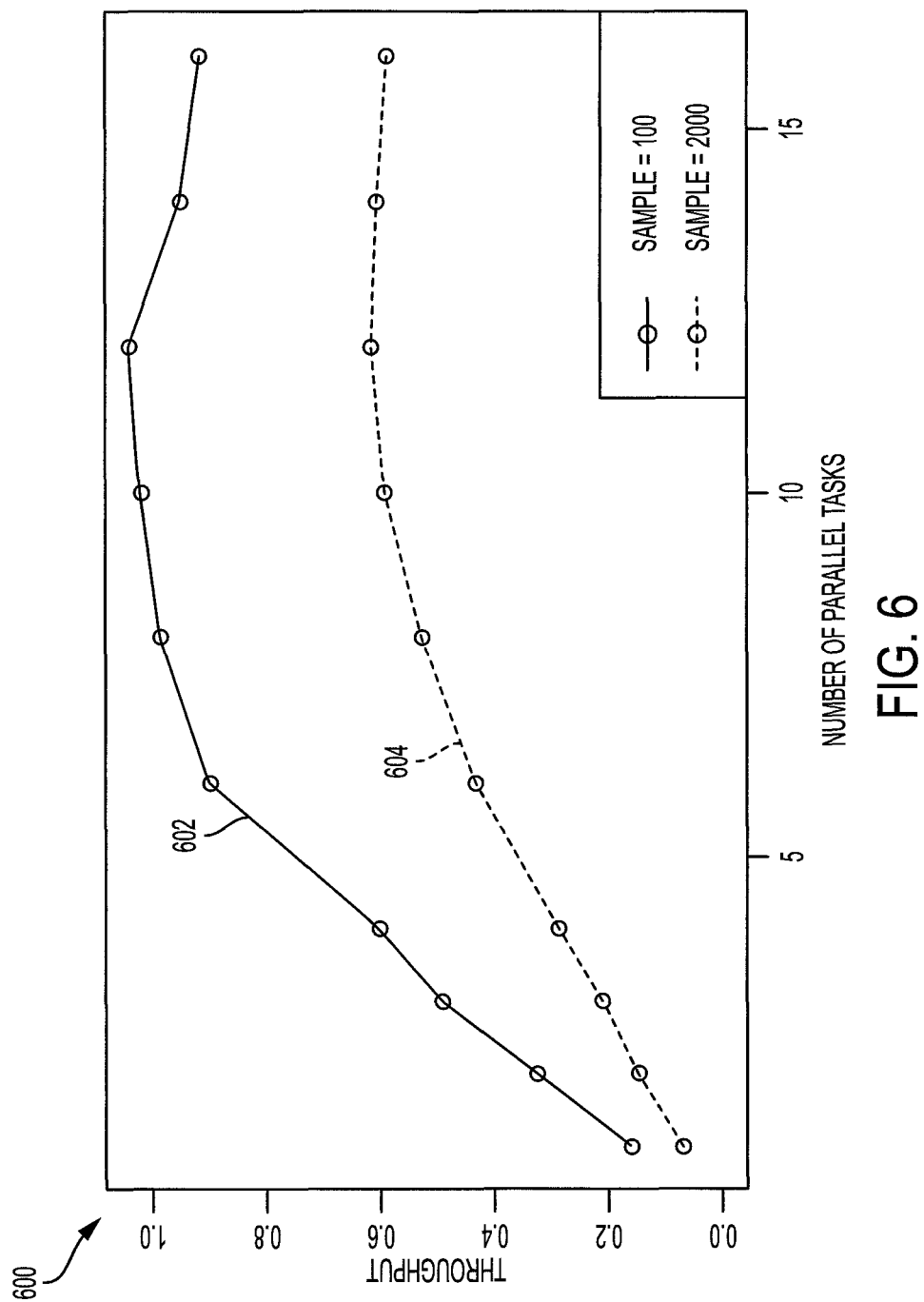
FIG. 6 shows an example of throughput of Pi for different values of containers.

To demonstrate that it is not always clear a-priori which number of concurrently executing tasks maximizes throughput, variations of Pi for varying numbers of containers on nodes with 8 cores were run. As a proxy for throughput, which will be formally defined in the next section, the total number of map tasks finished per unit of time was used. The graph 600 of FIG. 6 shows the average values over map tasks in the application for 100 samples 602 and 2000 samples 604. In investigating, it appears that maximal throughput was attained when running 12 tasks in parallel. This is neither the number of cores, nor twice the amount, as could be speculated due to hyper-threading. It is hence not straightforward to correctly configure the container size in terms of CPU resources.

It is therefore desirable to determine the optimal combination of tasks not as a single-dimensional number, but as a multi-dimensional vector that accounts for multiple resources. This requires first eliminating the relative load tasks put on these resources (CPU, disk I/O, memory), then building a model of task completion time based on task resource requirements and existing load on a node.

Later, it will be seen that it is indeed possible to add disk-intense tasks on a node that is already experiencing heavy CPU load without significantly reducing the performance of the CPU intense tasks, and hence increasing throughput "for free."

Next, a problem in terms of estimating resource requirements for tasks and using that information during scheduling to maximize throughput is formulated.

A cluster is a set of n nodes, cluster={$N^1, N^2, \ldots, N^n$}. The resource capability of node $N^k$ is denoted by a tuple $\pi^k = \langle \eta_c^k, \eta_m^k, \eta_d^k, \alpha_c^k, \alpha_d^k \rangle$ where $\eta_c^k$ is the number of core, $\eta_m^k$ is the amount of RAM, and $\eta_d^k$ is the number of physical disks on which HDFS is mounted; $\alpha_c^k$ and $\alpha_d^k$ represent CPU speed and disk bandwidth respectively. We use Π to denote the set of all $\pi^k$.

An application may be divided into multiple map and reduce tasks. Most of the work typically occurs in the map task. One assumption may be that all map tasks from the same application have very similar resource requirements; this disclosure will therefore refer to the resource requirements of an application and the resource requirements of one of its map tasks interchangably.

We refer to the set of l applications running on the cluster as A={$A^1, A^2, \ldots, A^l$}. The overall resource requirements of an application $A^j$ is denoted by a tuple $\theta^j = \langle c^j, d^j, m^j \rangle$, where $c^j$ denotes the CPU time in seconds, $d^j$ denotes the sum of bytes written and read to/from disk, and $m^j$ denotes the peak memory usage. Θ denotes the set of all $\theta^j$.

One possible definition of throughput is that it is the number of completed applications (or tasks) per unit of time. However, this definition of throughput does not take the size of an application into account; hence, maximizing it would favor smaller applications (or tasks) over larger ones. Instead, a better definition may be made in terms of the normalized number of completed map tasks, where normalization is done based on a notion of size of tasks. To account for this, it is defined that the size $\lambda_j$ of a map task belonging to application $A^j$ is the time to finish the task on a reference node where no other tasks are running. This seems to be an adequate measure of how much "work" is performed by the task. But, the methodology described could equally be made to work with other measures or definitions of size.

This disclosure hence provides one definition of the throughput of a cluster as:

$$\tau(\text{cluster}) = \sum_{i=0}^{n} \sum_{j=0}^{l} \frac{\lambda_j y_{ij}}{\bar{t}_{ij}} \quad (2)$$

Where $y_{ij}$ is the total number of tasks completed of application application $A^j$ on node $N^i$, and $\bar{t}_{ij}$ is the average completion time for these tasks.

This definition of throughput is made in terms of hindsight measurements. Hence, in order to maximize throughput by making intelligent scheduling decisions, it is necessary to predict throughput. Accordingly, there is a need to develop a model of throughput that depends on the decisions made in scheduling.

The result of scheduling is an assignment. An assignment is a matrix, for example:

$$X = [X_{ij}]_{\substack{i \in [0,n] \\ j \in [0,l]}} \quad (3)$$

Where $x_{ij}$ denotes the number of containers of application $A^j$ to be run on node $N^i$ as this moment in time.

Given the definition of throughput above, the predicted throughput for a certain assignment may be formulated as:

$$\bar{\tau}(\text{cluster}, X) = \sum_{i=0}^{n} \sum_{j=0}^{l} \frac{\lambda_j y_{ij}}{t_{ij}^*} \quad (4)$$

Where $t^*_{ij}$ is the predicted average time to complete tasks of application $A^j$ on node $N^i$. Hence, the scheduling goal can be concisely, albeit abstractly, stated as computing:

$$X^* = \underset{X}{\text{argmax}} \, \bar{\tau}(\text{cluster}, X) \quad (5)$$

Subsequently, it will be shown how to automatically learn a model of task completion time $t^*_{ij}$. This time to complete tasks depends on three entities: (i) the resource requirements θ of all applications running on node $N^i$, including $A^j$, which can be measured; (ii) the resource capabilities $\pi^i$ of the node, which is known; and (iii) the chosen assignment X.

It will then be described how to maximize the predicted throughput while respecting data locality consideration. As mentioned above, data locality is a feature of HADOOP®, and the scheduler may optimize (and optionally optimize only) within the flexibility provided by the redundant storage of data on multiple nodes, and optimize (and optionally optimize only) in terms of the assignment to those nodes.

It will now be described how to learn a model of task completion time and how to use this in an optimization problem to maximize throughput.

In order to derive a model of task completion time, it is convenient to use a notion of load on existing resources. This disclosure denotes the load on node $N^k$ by a tuple $L^k = \langle L_c^k, L_d^k, L_m^k \rangle$, where $L_c^k$ is the CPU load, $L_d^k$ the disk load, and $L_m^k$ the memory usage. An approach to estimate these loads given the set of tasks running on $N^k$, and some measurable resource usages of these tasks is presented in the following paragraphs.

Figure 7:
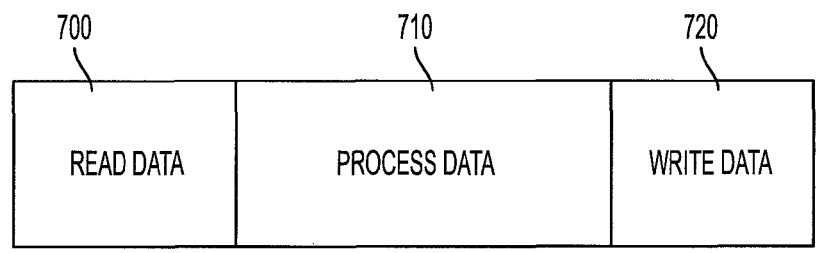
FIG. 7 illustrates a resource-orientated, abstract timeline of a map task.

Every application imposes a certain load on the CPU, memory and Disk of a node, depending on the CPU, memory and Disk requirements and the number of containers allocated to the application on the node. At the map task level, we assume the execution flow which is show in FIG. 7. With reference thereto, read data 700, process data 710, and write data 720 are shown.

One assumption may be that map tasks first read files 700, then processes 710 the read content based on their map function, and finally write data back 720 to a local disk. Reading and writing of the filesystem constitutes the total disk load imposed by the task. Another assumption may be that the load imposed on a CPU core is proportional to the CPU time of the task divided by the overall task completion time, and the amount of disk I/O load is proportional to the number of bytes read and written divided by completion time. For a task of application $A^j$, we can use the following entities as a proxy for these loads:

$$R_c^j = \frac{c^j}{c^j + d^j}$$

$$R_d^j = \frac{d^j}{c^j + d^j}$$

Where $c^j$ and $d^j$ are the CPU time and total bytes written and read by a task. For example, applications Pi and Sort have the same CPU seconds. However, Sort has much more disk activity than Pi (cf. Pi of Table 1) and as a result, its $R_d$ value is much higher than its $R_c$ value. This reflects the fact that Sort is a disk I/O intense application and Pi is a CPU intense application.

If $l^k$ applications are running on a node $N^k$, then the total loads on $N^k$ can computed as:

$$L_c^k = \Sigma_{i=1}^{i=j} R_c^i x_k^i$$

$$L_d^k = \Sigma_{i=1}^{i=j} R_d^i L_k^i$$

$$L_m^k = \Sigma_{i=1}^{i=j} m^i x_k^i$$

Every container uses a certain amount of memory that is not shared. Therefore, the total memory load imposed by an application can be calculated by simply adding the memory used by all containers. When the memory load $L_m^k$ on a node is lower than the node's total available memory, one assumption may be that the performance of tasks on that node is not affected by the memory load, but that performance degrades drastically when total available memory is exceeded (and the operating systems starts swapping). Therefore, in one embodiment, in a later scheduling policy task combinations that would oversubscribe memory are not considered, and as result of this decision it is sufficient for us to learn a model of task completion that only regards CPU and disk load.

Recall that it is advantageous to learn a model of task completion time on a given node under a given (or assumed) assignment, and knowing only the overall resource requirements of the first execution of the task (CPU time and disk I/O in bytes). Optionally, the completion time of the first execution of a task as a proxy for all other instances of this task may be used, but this would not allow an estimate of how much longer or shorter the task would take if it was run on a different node with a different load.

In one embodiment, the following function is used as an inductive bias for the model to be learned:

$$t_{kj}^* = \rho(\langle c^j, d^j \rangle, \langle \eta_c^k, \eta_d^k, \alpha_c^k, \alpha_d^k \rangle, \langle L_c^k, L_d^k \rangle) \qquad (6)$$

$$= \lambda^j + c^j \text{sigmoid}(L_c^k - \eta_c^k)(L_c^k)^2 \alpha_c^k +$$

$$d^j \text{sigmoid}\left(\frac{k}{d} - \eta_d^k\right)\left(\frac{k}{d}\right)^2 \alpha_d^k$$

Recall that the first set of parameters are just the CPU time and bytes written and read by tasks of $A^j$. The second set of parameters capture the resource capabilities of node $N^k$ and the last set of parameters represents the current load on these resources, as a result of other tasks running on the node (as stated previously, in one aspect, memory requirements and load in this model are disregarded; instead, a design may be created such no task combinations that oversubscribe on memory are considered).

The first, $c^j$ and $d^j$, are the only two values that need to be measured at runtime, since they are application specific, and it is unknown what all applications ever submitted to the cluster ahead of time are. The third, $L_c^k$ and $L_d^k$, can be computed at runtime based on the schedulers knowledge of which tasks have already been assigned and are currently running on the node. Hence, the parameters that need to be learned are the second set: $\eta_c^k, \eta_d^k, \alpha_c^k, \alpha_d^k$.

Next, the disclosure will describe an offline approach to learn these parameters for every node in the cluster. For a real-world cluster in one embodiment, this learning phase happens offline before the cluster can be brought online for production.

To learn these parameters, two applications with different resource requirements using different configurations were run. To vary the load, each configuration enforced a different number of containers for the two applications on each node. Each configuration was designed to impose a certain CPU and disk load ($L_c$ and $L_d$) on every node. A record was kept of the average completion time of map tasks $T_{avg}$ for every configuration and node and used an optimizer in R to fit our model to these measurements. While running these experiments, the resource capabilities, $\pi$, of each node was also measured. During training, HADOOP® was also configured in such a way as to run all reduce tasks on a designated node that was not included in the set of training nodes.

Figure 8:
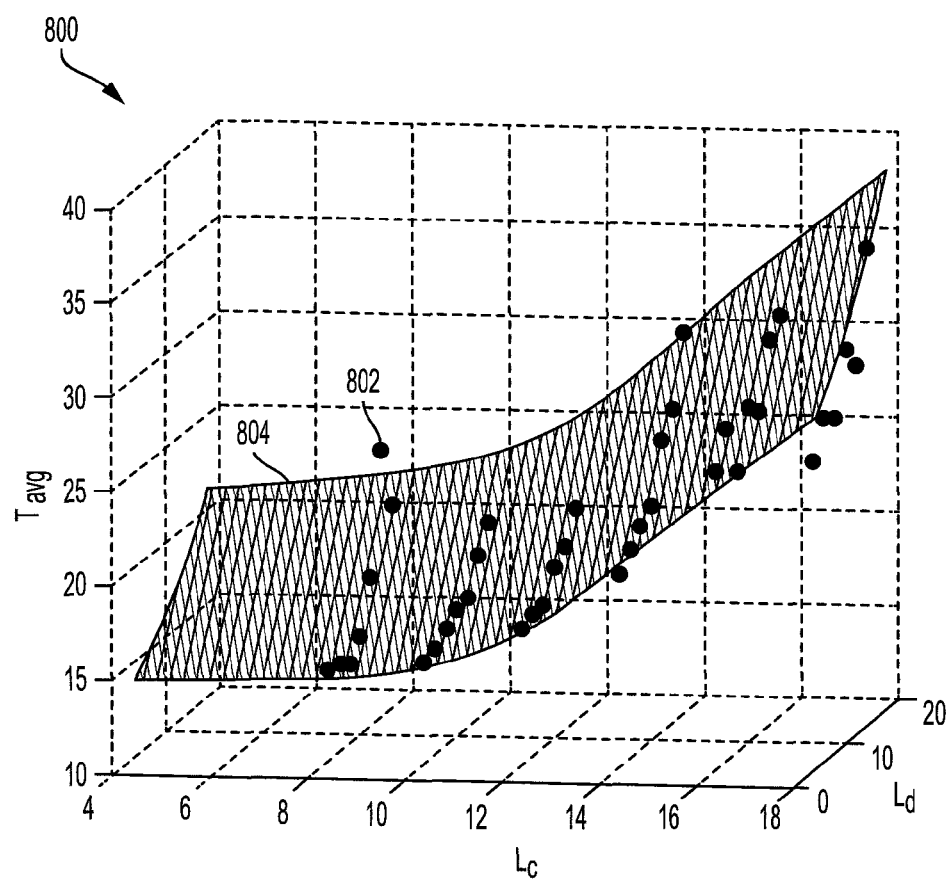
FIG. 8 illustrates training data and fitted model of task completion time for Pi on a node with eight CPU cores.

Graph 800 of FIG. 8 shows an example of training data 802 (represented by solid dots) and a fitted model 804 (represented by the screen structure). It further shows the values of the average completion time, $T_{avg}$, for map tasks of Pi running on a node with eight CPU cores and one disk for various loads. These loads, ($L_c$ and $L_d$), were a result of different combinations of Pi and Sort running on the node. The dots 802 in FIG. 8 show the empirical $T_{avg}$ value of Pi on the node. These values increase more rapidly with $L_c$ compared to $L_d$. This is because Pi is a CPU intensive application. Also note that FIG. 8 reflects the eight CPU cores, as this is roughly where the times start increasing in the $L_c$ dimension.

The model in Equation (6) uses the size of the application, $\lambda^i$, as the intercept, which determines the execution time of a task under minimal load. The sigmoid function is used to model the transition between plateauing completion times, while parallel resources are available (for example, multiple CPU cores), and the region in the load-space where resources are oversubscribed. This reflects the fact that, as soon as $L_c^k$ and $L_d^k$, become larger than $\eta_c^k$ and $\eta_d^k$ respectively, i.e., the load exceeds the node's capabilities, and tasks start experiencing a slowdown. Empirically, the experimental results showed a super-linear increment in task completion with respect to $L_c^k$ and $L_d^k$; therefore, the increase in completion time using $(L_c^k)^2$ and $(L_d^k)^2$ was modeled.

Even with a fairly basic model of task completion time, an increase in the throughput of a cluster was seen.

To find the optimal number containers, we use $\rho(\langle c^j, d^j \rangle, \langle \eta_c^k, \eta_d^k, \alpha_c^k, \alpha_d^k \rangle, \langle L_c^k, L_d^k \rangle)$ as predicted task completion time $t^*_{ij}$ in Equation (4), which provides:

$$X^* = \underset{X}{\text{argmax}} \sum_i \sum_j \frac{x_{ij}}{\rho(\theta^j, \pi^i, L^i)} \quad (7)$$

As discussed above, the total cluster throughput is a summation of the throughput of all the nodes in cluster. For simplicity, it may be assumed that the throughput of a node is independent from all throughput of all other nodes. This is not entirely accurate given a set of tasks to be allocated, as allocating a task to one node means that it will not be allocated to a different node. But the effect of this dependence seems minor and also nearly vanishes for large numbers of tasks being allocated.

With this simplification, Equation (7) can be expanded to:

$$X^* = \sum_i \underset{X}{\text{argmax}} \sum_j \frac{x_{ij}}{\rho(\theta^j, \pi^i, L^i)} \quad (8)$$

Equation (8) breaks down the maximization of cluster throughput into the maximization of throughput of individual nodes. This allows the scheduler to maximize each node's throughput separately by allocating optimal numbers of containers to applications with different relative resource loads. Hence, the overall optimization problem can stated as:

$$X^* = \Sigma_i X^*_k \quad (9)$$

Where $x^*_k$ denotes the vector of containers to allocate for each application on node $N^k$ in order to locally maximize throughput on this node:

$$X^*_k = \underset{x_k}{\text{argmax}} \sum_i \frac{x_{ki}}{\rho(\theta^j, \pi^k, L^k)} \quad (10)$$

Given the trained model described above, this equation can be used directly to formulate a scheduling policy, which we describe programmatically as follows.

In one aspect, a scheduler in HADOOP® version 2 (YARN) is implemented by extending the existing Fair-scheduler. The implementation can be succinctly described by its three main functions, AddApplication, RemoveApplication and DARASchedule (dynamically adaptive resource aware schedule). Resource capabilities ($\pi^N$) are estimated for every node N in the cluster before starting the cluster for production.

In a production phase, when an application $A^{New}$ arrives, one of the map tasks from the application is executed on a node and its overall resource requirements, $\theta^{New}$, (CPU time and total number of bytes written and read) is obtained by the NodeManager from the operating system on the node.

This information is sent to the ResourceManager. The list of all applications A and their resource requirements, $\Theta$, as well as the current assignment, X, are known from the records kept by the scheduler.

The function ComputeOptimalAssignment maximizes the expression shown in Equation (10) by finding the optimal number of containers for each application for a given node N. This function takes as input the resource requirements of applications, $\Theta$, and the capabilities, $\pi^N$, of the node.

To avoid the over-subscription of memory, this method may optionally only explore the space of combinations of tasks where the sum of the peak memory usages is less than total available memory on the nodes. Hence, in one aspect, the returned assignment never oversubscribes memory. The returned list of the optimal assignment for this node may be stored as a global variable (at least in this pseudo-code) and is here donated as $x^*_N$. Recall that this assignment may be a simple list of numbers, one for each application running on the cluster, indicating the best combination of tasks to run of these applications in order to maximize throughput.

The AddApplication function may run when a new application is submitted to the cluster.

AddApplication($A^{New}$, Cluster)                    Algorithm 1

$\Theta^{New} \leftarrow getResourceReq(A^{New})$ for each Node $N \in$ Cluster $$do \begin{cases} \pi^N \leftarrow N.getResourceCapabilites \\ A \leftarrow N.getRunningApps() \\ \Theta \leftarrow getResourceReq(A) \\ A \leftarrow A + A^{new} \\ \Theta \leftarrow \Theta + \theta^{New} \\ x^*_N \leftarrow computeOptimalAssignment(\Theta, \pi^N, x_N) \end{cases}$$

At the completion of an application $A^{Done}$, $\Theta$ is updated by removing $A^{Done}$ from the list of running applications, A. The optimal assignment for the remaining applications may be updated by calling the optimization function again.

One implementation of Algorithm 1 may be that, for each node in a cluster, capabilities, $\pi^N$, of the node; and the list of running applications, A, are determined. A may then be used to determine resource requirements, $\Theta$. A may then be updated based on a new application, $A^{new}$; and $\Theta$ may be in turn updated. Based on the updated $\Theta$, the new optimal task assignment policy is calculated.

Node $N \in (A^{Done},$ Cluster)                         Algorithm 2 for each Node $N \in$ Cluster $$do \begin{cases} \pi^N \leftarrow N.getResourceCapabilites \\ A \leftarrow N.getRunningApps() \\ A \leftarrow A + A^{Done} \\ \Theta \leftarrow getResourceReq(A) \\ x^*_N \leftarrow computeOptimalAssignment(\Theta, \pi^N, x_N) \end{cases}$$

The optimal assignment corresponds to, for example, the set of vectors that were combined to produce FIG. 4 to reach the location in the resource load space where resources are optimally utilized and hence throughput is greatest.

One implementation of Algorithm 2 may be that, for each node in a cluster, capabilities, $\pi^N$, of the node; and the list of running applications, A, are determined. A is then updated based on the completion of an application $A^{Done}$. A may then be used to determine resource requirements, $\Theta$. An optimal assignment, $x^*_N$, may then be computed.

Once the optimal number of containers for every running application on every node is determined, this information can be exploited to make scheduling decisions. The native HADOOP® scheduler sorts task/machine pairs according to whether they are local (data for the task is available on the machine), on the same rack, or remote. A routine may be introduced based on a task requirements estimation called BestAppToAdd to break ties within each of these tiers as shown in Algorithm 3. For two local apps, the one most compatible with the machine may be run first.

Algorithm 3

*DARASchedule*(Cluster, Request)
for each Node $N \in$ Cluster do $\Bigg\{$ *AppsWithLocalTasks* ← *N.getLocalApps*(Request)
*AppsWithRackTasks* ← *N.getRackApps*(Request)
*AppsWithOffSwitchTasks* ← *N.getOffswitchApps*(Request)

if *AppsWithLocalTasks* ≠ *NULL* then $\begin{cases} A^{best} \leftarrow BestAppToAdd \\ (AppsWithLocalTasks, N) \\ AssignTaskforApp(N, A^{best}) \end{cases}$ else if *AppsWithRackTasks* ≠ *NULL* then $\begin{cases} A^{best} \leftarrow BestAppToAdd \\ (AppsWithRackTasks, N) \\ AssignTaskforApp(N, A^{best}) \end{cases}$ else $\begin{cases} A^{best} \leftarrow BestAppToAdd \\ (AppsWithOffSwitchTasks, N) \\ AssignTaskforApp(N, A^{best}) \end{cases}$ In one implementation of Algorithm 3, for each node in a cluster, apps with local tasks; apps with rack tasks; and apps with off switch tasks may each be determined. If a set of apps with local tasks is determined not to be null, $A^{best}$ may be determined based on the apps with local tasks. Alternatively, if a set of apps with rack tasks is determined not to be null, $A^{best}$ may be determined based on the apps with rack tasks. Alternatively, $A^{best}$ may be determined based on the apps with off switch tasks.

Algorithm 4: BestAppToAdd(A, N)
return ($argmax_{A \in A} x^*_{A,N} - x_{A,N}$)

In BestAppToAdd, $x^*_{A,N}$ denotes the optimal number of containers to allocate to application A on node N and $x_{A,N}$ is the number of containers node N has currently allocated for A. The term $x^*_{A,N} - x_{A,N}$ computes the current under-allocation for the application on this node compared to the optimal allocation. When selecting tasks to run on a node, the scheduler may use this number to determine the application A whose actual assignment is lowest compared to its optimal assignment. Hence, adding tasks of this application gets closer to the optimal assignment. Note that this scheduler, like others, never removes running tasks from a node to achieve the optimal assignment. Hence, over-allocations are not considered in this function.

In one implementation of Algorithm 4, an argmax is returned.

To evaluate the performance of the approaches described herein, experiments were conducted on a six node HADOOP® cluster. Each node had 8 physical CPU cores, 12 GB of RAM, and ran CentOS 5.6. This experiment compared the performance of the above-described Scheduler against Capacity-scheduler and Fair-scheduler.

Fair-scheduler and Capacity-scheduler are the schedulers underlying resource-aware big data platforms such as Mesos (an open sourced cluster manager). Mesos fairly shares cluster resources among different frameworks such as HADOOP® and MPI. However, the above-described experiments only consider HADOOP®. Mesos implements Dominant Resource Fairness (DRF) to fairly allocate CPU and memory among different users. It assumes a-priori knowledge about the resource requirements of jobs, unlike other applications, which automatically infer it. Another reason why comparing to Mesos is not appropriate is that it maximizes fairness rather than throughput, so a comparison would not be fair.

To investigate a container allocation scheme, various combinations of HADOOP® benchmark applications were run on the cluster.

The approaches described herein determine the optimal number of containers per application for every combination. Table 2 shows these numbers for one of the nodes in the cluster for a few example workloads. All six nodes in the cluster are identical, therefore, the optimal number of containers to allocate is the same for all nodes of the cluster. Any heterogeneity in cluster resources can actually be exploited for improved performance as well, and would be able to exploit this seamlessly, too.

TABLE 2

Optimal number of containers as computed for every application and their combinations.

| | Allocation per Application | | | |
|---|---|---|---|---|
| Workload | Pi | Sort | WordCount | RandomWriter |
| Pi | 12 | — | — | — |
| Sort | — | 7 | — | — |
| WordCount | — | — | 14 | — |
| RandomWriter | — | — | — | 3 |
| AggWC | — | — | — | — |
| Pi + Sort | 12 | 5 | — | — |
| Pi + WordCount | 9 | — | 7 | — |
| Sort + WordCount | — | 0 | — | — |

Table 2 shows allocation of the highest number of concurrent containers when running WordCount alone. This is because WordCount uses a good mix of CPU and disk I/O. On the other hand, RandomWriter generates lots of disk I/O load but does not need CPU for very long. Due to the limited bandwidth of disks, the number of containers that maximize throughput when running RandomWriter alone is very small. For the combination of Sort and WordCount, Sort gets no containers at first because running WordCount will keep both the CPU and Disk busy.

Notably, Pi is so CPU intense and Sort is so disk intense that the optimal number of Pi containers to run does not change when adding a Sort application. Hence, the Sort tasks are being processed "for free."

Various synthetic workloads were constructed based on publicly available HADOOP® traces from FACEBOOK®.

FACEBOOK® has published traces of its clusters in order for others to be able to simulate real workloads from FACEBOOK® HADOOP® cluster. A workflow is defined as a set of MapReduce jobs that are submitted to the cluster in certain intervals. However, FACEBOOK® did not publish the job specific resource requirements, nor did they provide the actual jobs (MapReduce programs). Instead, they suggest to construct the simulated workloads purely based on IO operations that read and write a specific number of bytes to and from disk. This is not sufficient for many purposes. In order to evaluate the effectiveness of scheduling, more may be needed such as heterogeneous workflows with varying disk IO, memory, and CPU requirements. Therefore, some experiments were conducted using the submission intervals from the FACEBOOK® traces, while jobs were independently constructed. The constructed workflows contain between one and five MapReduce jobs, randomly selected from a pool of standard MapReduce jobs. The HADOOP® distribution includes benchmark MapReduce jobs. These have different kinds of resource requirements (CPU and IO) and were therefore a good pool to choose from. These jobs appear in Table 1.

In order to simulate the submission intervals (arrival times) of new jobs in accordance with the FACEBOOK® traces, samples were randomly drawn from the populations of submission intervals provided in FACEBOOK® HADOOP® traces.

Figure 9:
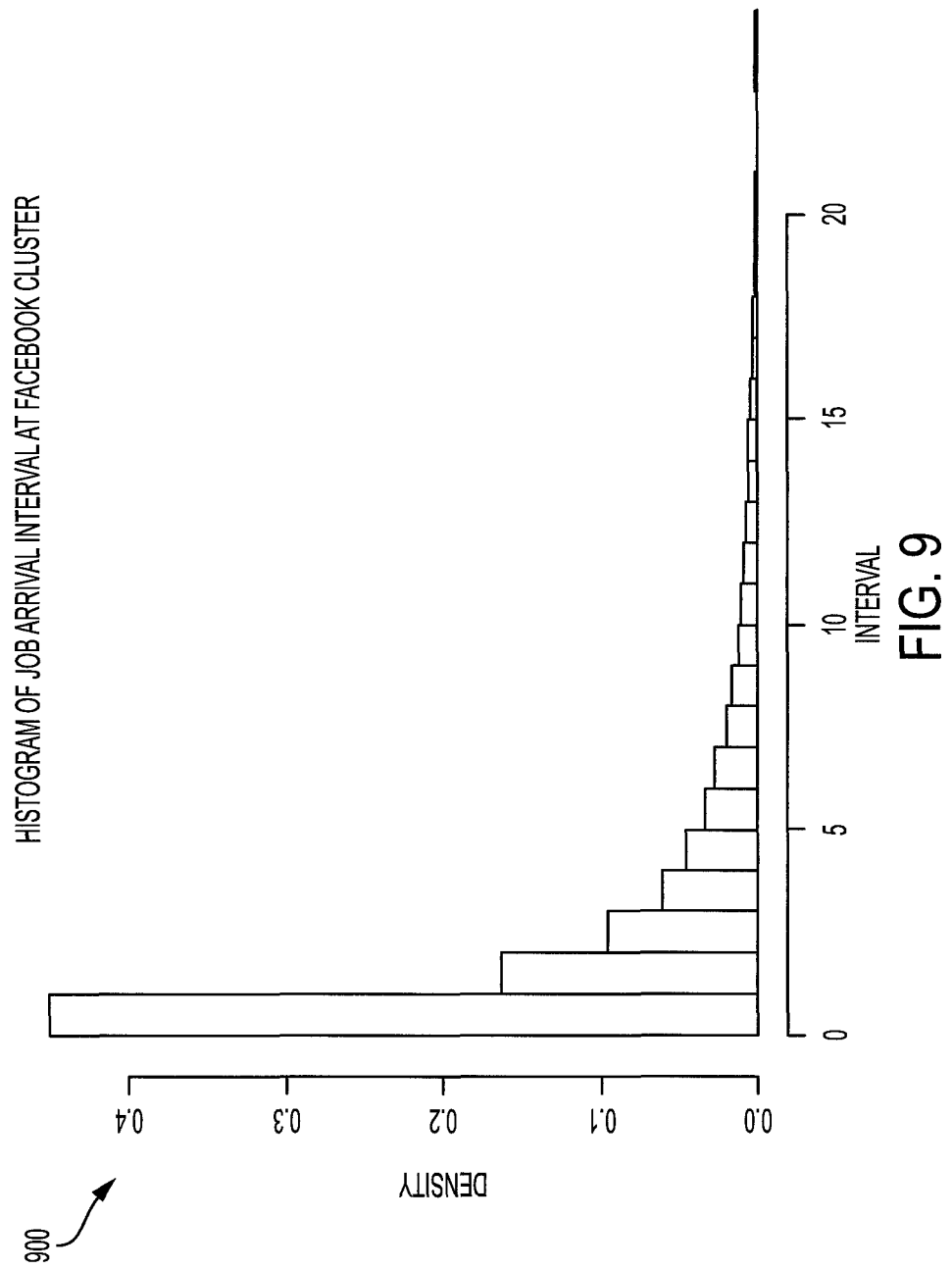
FIG. 9 illustrates a histogram of time interval between two application submissions at FACEBOOK® HADOOP® cluster.

Graph 900 of FIG. 9 shows a histogram of the arrival intervals of jobs in FACEBOOK's® traces.

Experiments conducted included 16 constructed, synthetic workloads and every workload contains one or more MapReduce application from HADOOP® benchmark examples.

Figure 10:
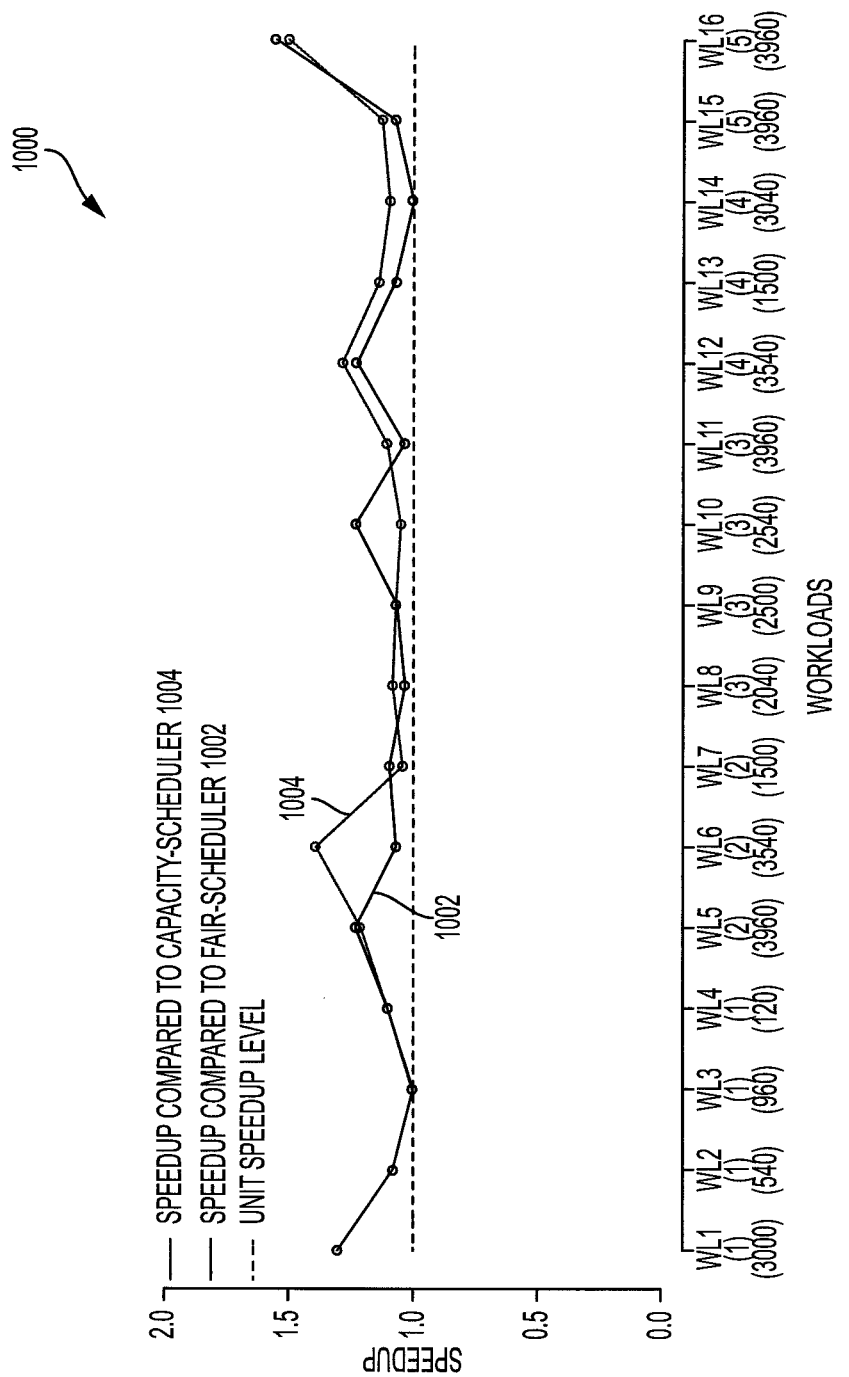
FIG. 10 illustrates speedups gained by an embodiment over Fair scheduler and Capacity scheduler.

Performance was compared against Capacity-scheduler and Fair-scheduler in terms of speedup of workload execution on the cluster. Speedup gained was measured by dividing time to complete workload using Fair and Capacity by time to complete workload using the above-described experiment. Workload completion time was defined as the time from the beginning of execution until the completion the application finishing last. Speedup results are shown in graph 1000 of FIG. 10. With reference thereto, Speedup was gained by running workloads compared to Fair-scheduler and Capacity-scheduler. For the 16 workloads an average speedup of 1.14 compared to Fair-scheduler 1002 and 1.16 compared to Capacity-scheduler 1004 was demonstrated. On the X axis, every workload (WL1-WL16) indicates the number of applications contained (e.g. 1, 2 . . . 5) and the total number of tasks (e.g. 3000, 540, 960 . . . 3960).

The experimental results demonstrate speeding up execution of all the workloads compared to Capacity-scheduler and Fair-scheduler. Even though the design was to optimize the execution of map tasks only, the speed up of overall MapReduce applications was still seen.

To further evaluate the container allocation policy of the methods described herein, a comparison was conducted against Capacity-scheduler and Fair-scheduler in terms of throughput.

Figure 11:
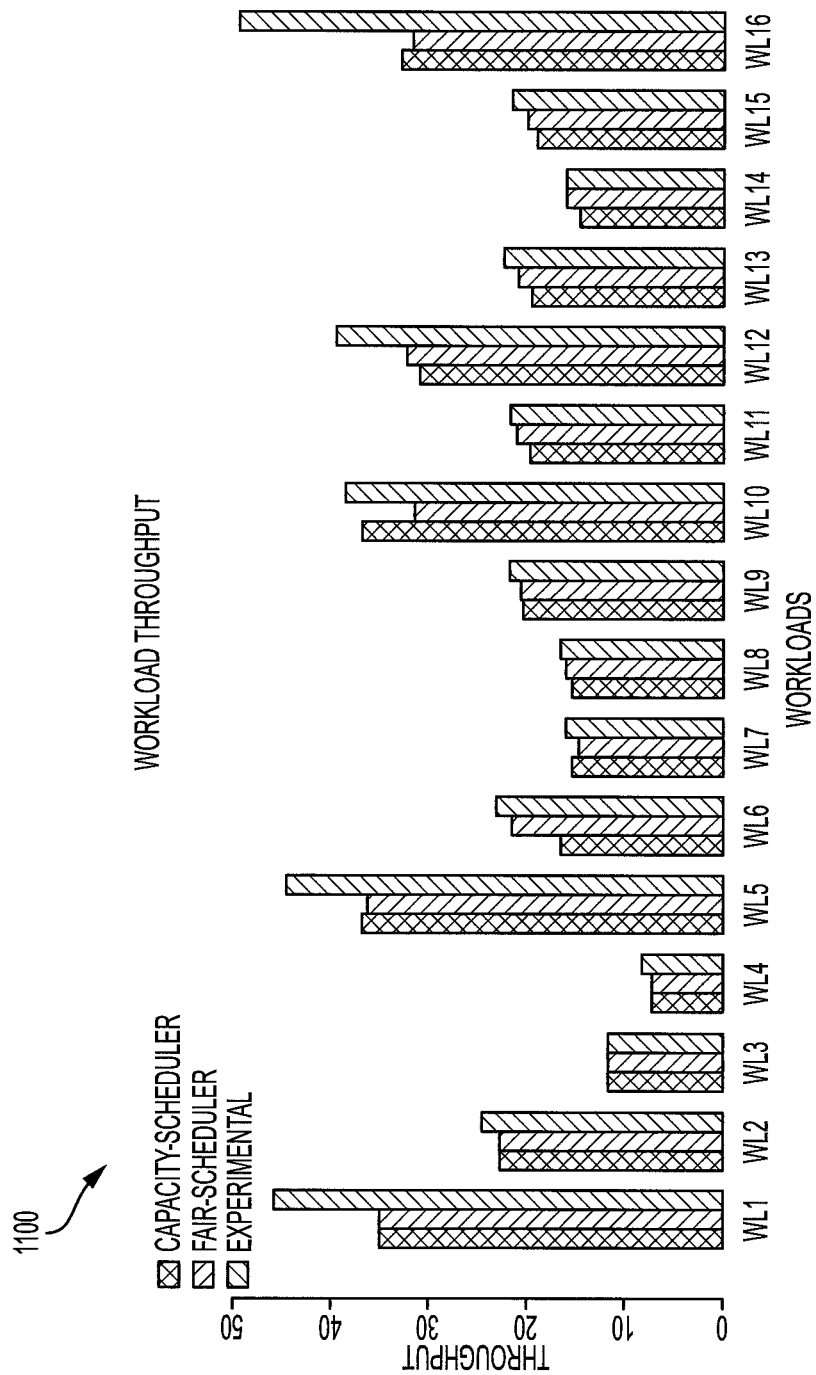
FIG. 11 illustrates a throughput comparison on HADOOP® benchmarks.

The cluster throughput was measured using Equation (2). The time variable used in Equation (2) was measured as the time to complete a workload. In case of multiple applications in a workload, the completion time of the application finishing last may be used in the throughput measurement. Results are shown in graph 1100 of FIG. 11.

The results show that for the workloads (WL1-WL16 of FIG. 10) the experimental algorithm delivered higher throughput than Fair-scheduler and Capacity-scheduler. For applications that are CPU intensive, the experimental algorithm may assign more containers than for IO intensive applications. For the latter, it turns out that the optimal number of containers is significantly less than the number of CPU cores. Also the other rule of thumb for assigning containers, "amount of RAM divided by 1 GB," would not assign the optimal number of containers in terms of throughput. The methods described herein dynamically adapt container allocation to the resource requirements of the mix of applications running at any one time, and, as a result, achieve higher throughput.

Another way to understand the improved throughput achieved is to consider resource utilization. To illustrate this, Pi and Sort were run together on the cluster; and CPU usage while both the applications were active was monitored.

Figure 12:
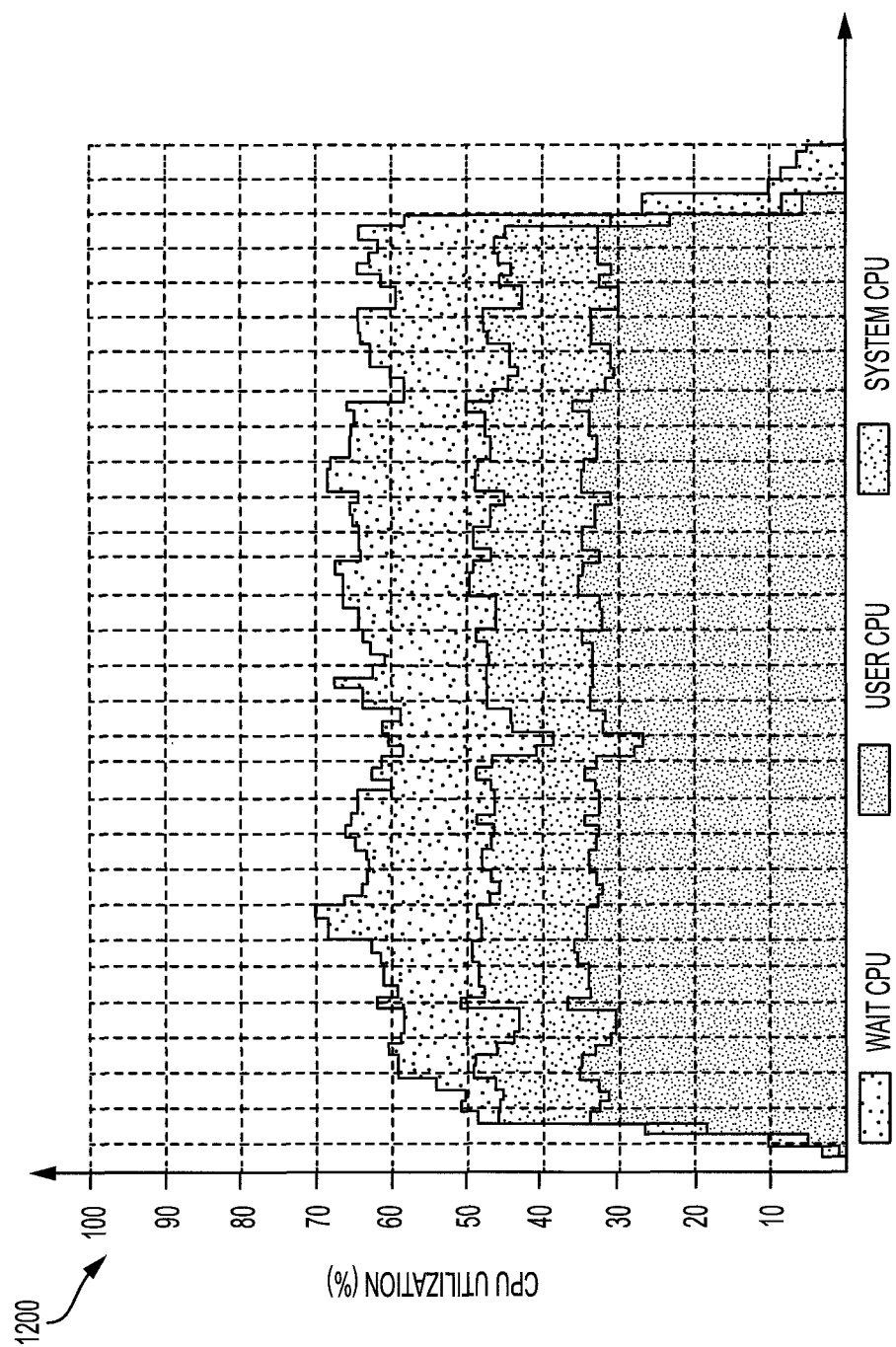
FIG. 12 illustrates CPU Utilization of the cluster when Pi+Sort are in parallel executed by an embodiment.
Figure 13:
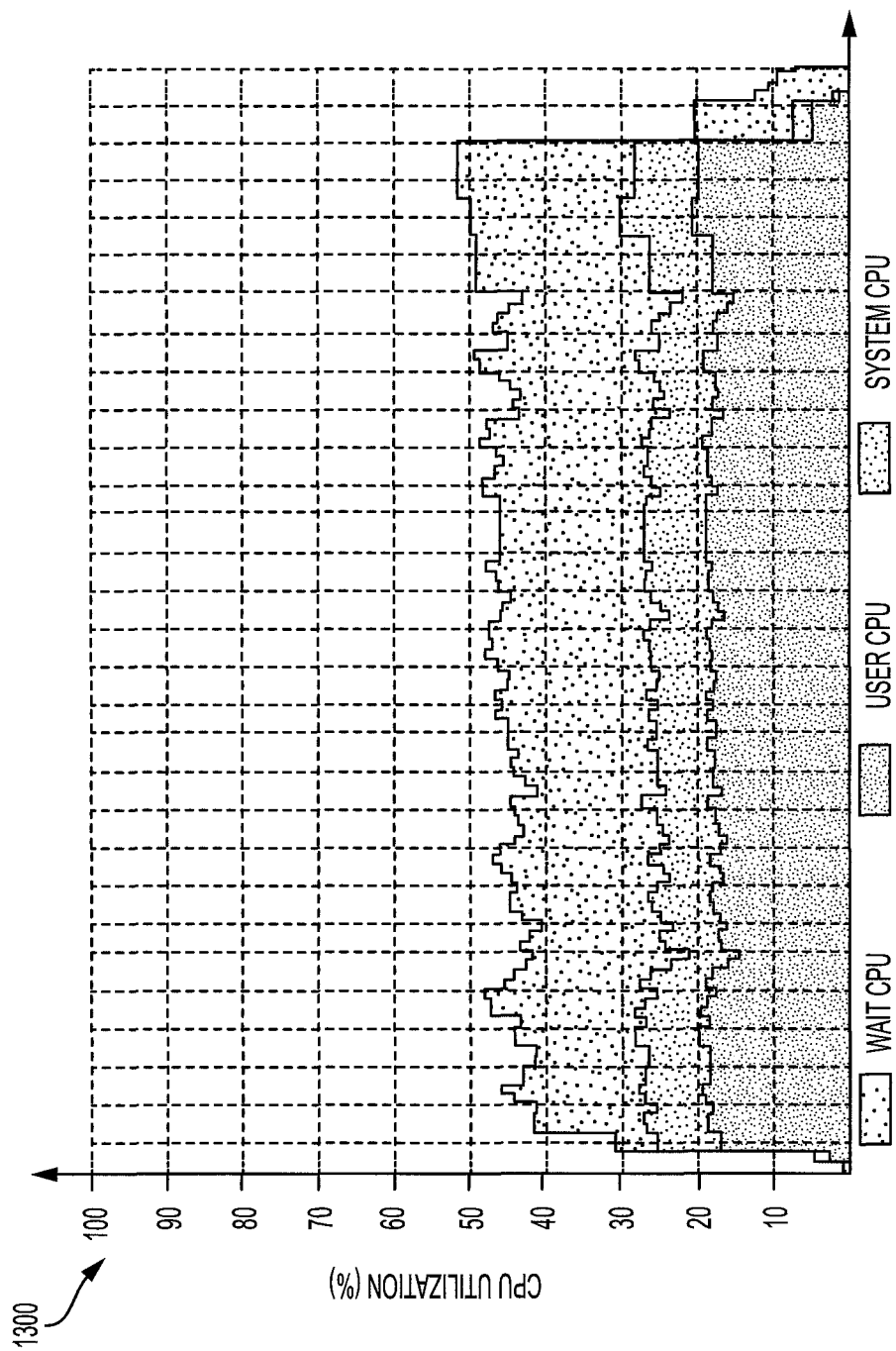
FIG. 13 illustrates CPU Utilization of the cluster when Pi+Sort are executed by Fair-scheduler.

Recall that Pi is a CPU intensive application and Sort is an IO intensive application. Therefore, both CPU and Disk are exploited during the execution of applications. Graph 1200 of FIG. 12 shows the CPU utilization when Pi+sort are in parallel executed for the system and methods described herein. Graph 1300 of FIG. 13 shows the CPU utilization when Pi+sort are executed by Fair-scheduler.

The systems and methods described herein exploit CPU much more efficiently than Fair-scheduler. For the embodiment described above, the average user CPU usage is around 35% and waiting for I/O is around 20% (FIG. 12). On the other hand, for Fair-scheduler with the average user CPU utilization around 17% and waiting for I/O is around 20% (FIG. 13). These results demonstrate that the methods described herein efficiently exploit multiple resources by allocating containers more intelligently based on its automatically inferred knowledge about their resource requirements. This example combines tasks in a way that when one application is waiting for IO, it can be exploited to do the additional processing.

Figure 14:
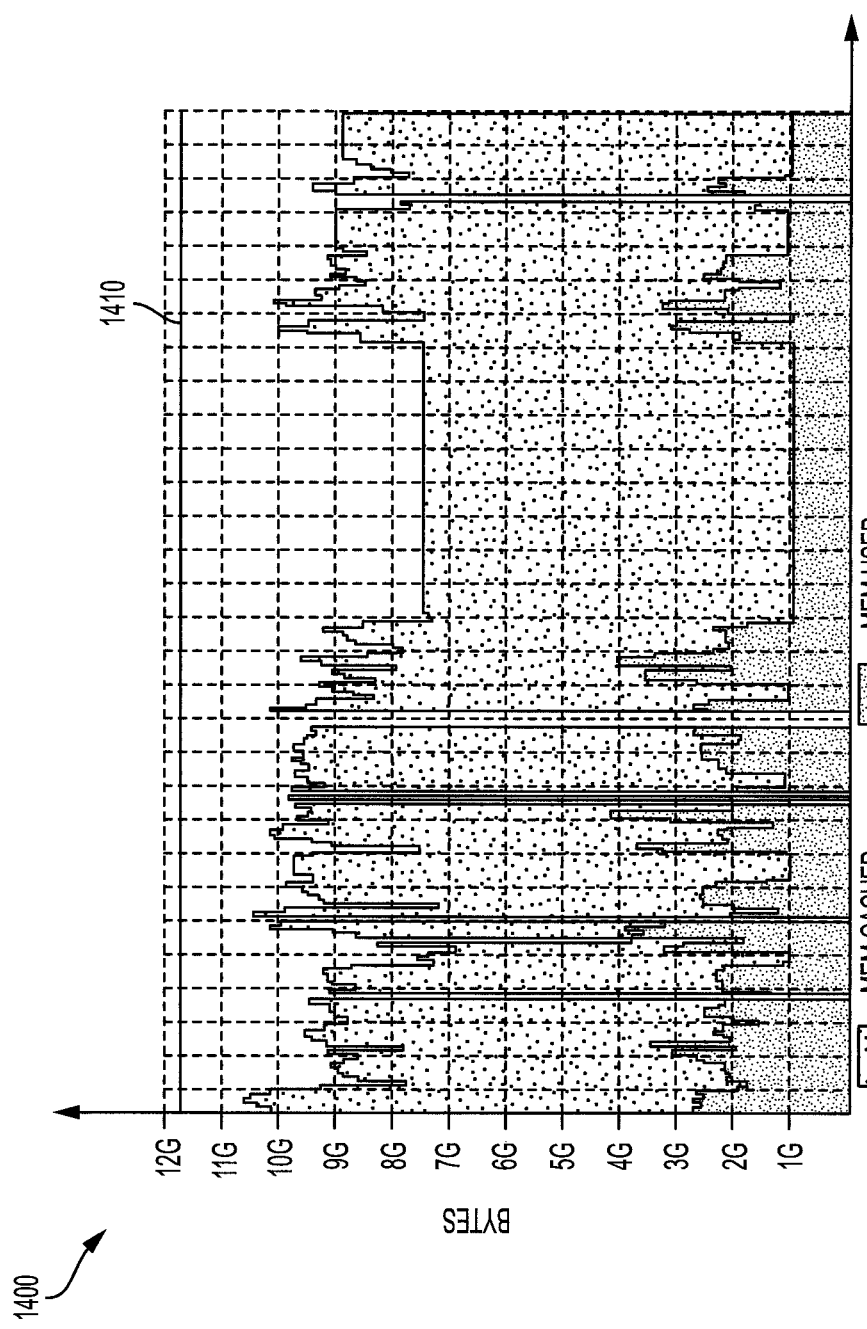
FIG. 14 illustrates memory usage of a node in the cluster while running different workloads using an embodiment.

In one embodiment, a design is carefully made to improve throughput without oversubscribing the available memory of a node. To validate this, memory used by every node of the cluster was monitored. Graph 1400 of FIG. 14 shows the memory usage of a node in the cluster during the execution of all the workloads with an embodiment, including total in-core memory 1410. These observations show that the actual memory used is far under the total memory on the node. Similar memory usage is reported from the other nodes in cluster.

Researchers and engineers have shown interest in the space of scheduling for MapReduce based systems. However, most of the work has been done on the improvement of the slot based architecture of HADOOP®. Therefore, some of the works might not be needed or useful to the container based architecture.

For the slot based structure, many resource aware schedulers have been proposed which dynamically attempt to allocate resource (slots) to tasks. RAS, is a resource aware scheduler that dynamically allocates Map and Reduce slots to improve the resource utilization. Similar to the methods described herein, RAS uses the job resource profile to implement such allocation policy. However, the offline approach used by RAS to generate performance model is impractical. Moreover, data locality is not addressed in the work. Unused MapReduced slots are dynamically assigned to active Map or Reduce tasks to improve the performance by dynamically providing fairness. However, one aspect does not apply to YARN because containers have no notion of Map or Reduce slots. Therefore, a free container can be assigned to either Map or Reduce task. A similar work is proposed to dynamically assign to passive slots (e.g. in earlier versions of Hadoop, a fixed number of slots are assigned for Map and Reduce tasks; if a node has Reduce tasks less than the assigned number of Reduce slots, then these slots are unused and referred to as passive slots) to other tasks. Another scheduling tool, MROrchastration, uses resource profile information to detect CPU and Memory contention. MROrchastration detects contentions by comparing resource usage of tasks among various nodes and provides them more resources.

The Context Aware Scheduler for Hadoop (CASH) assigns tasks to the nodes that are most capable of satisfying the tasks' resource requirements. CASH learns resource capabilities and resource requirements to enable efficient scheduling. CASH mainly assigns tasks to nodes that satisfy the requirements most efficiently. Nodes are assumed different by considering their static resource configuration. Unlike the methods described herein, they do not differentiate nodes in terms of real time load. Nodes with different loads have different performance. Also, CASH derives resource requirements in offline mode. Triple-queue is a dynamic scheduler that classifies jobs based on their CPU and IO requirements and put them in different queues. However, these queues work independently, in First Come First Serve (FCFS) manner. Resource utilization and throughput both can be improved if tasks from different queues are mixed optimally. Dominant resource fairness (DRF) is a resource allocation policy based on users' resource requirement. DRF allocates resources to users to achieve the maximum fairness.

Studies have shown the negative impact of resource contention in multicore systems. Therefore, in our approach, we learn the performance model of every node to maximize the throughput. The model characterizes the performance of node when tasks from multiple applications start exploiting the shared resources at the same time. The performance models of MapReduce tasks are derived to optimize MapReduce workflow. These models have two major limitations. First, they do not consider the real time load on nodes to predict the execution time. Second, they use many low level details that might not accessible during the execution of applications. For example, Late scheduler predicts task finishing time to take a decision about speculative execution in heterogeneous HADOOP® cluster. The approach uses a heuristic which assumes that the progress rate of tasks is constant in HADOOP® cluster. However, under the resource contention, the assumption is no longer true. Therefore, in order to estimate the task execution time under contentions, a more sophisticated model is required. An abstraction of MapReduce like system has been discussed to improve the job completion time; but, it does not take into account the actual resource requirements.

The systems and methods described herein represent a novel approach for scheduling jobs on HADOOP® clusters to maximize throughput. The framework may dynamically determine the optimal number of containers to run for each application and node. Unlike previous schedulers, some embodiments use an estimate of the actual resource requirements of running application together with resource capabilities of nodes to optimize for throughput. Two aspects of the methods described herein follow. First, a model was presented of task completion time that can be trained offline to account for node-specific capabilities, and then parameterized online to account for application specific resource requirements, based solely on the actual overall resource consumption of the first map task. Second, an algorithm was presented that can use this model to make scheduling decisions that improve throughput. Empirical results confirm that the algorithm performs better than existing HADOOP® schedulers in terms of throughput, speed up, and resource utilization. While discussed in the context of HADOOP®, the underlying idea and overarching approach generalizes to other frameworks of distributed computing as well.

Figure 15:
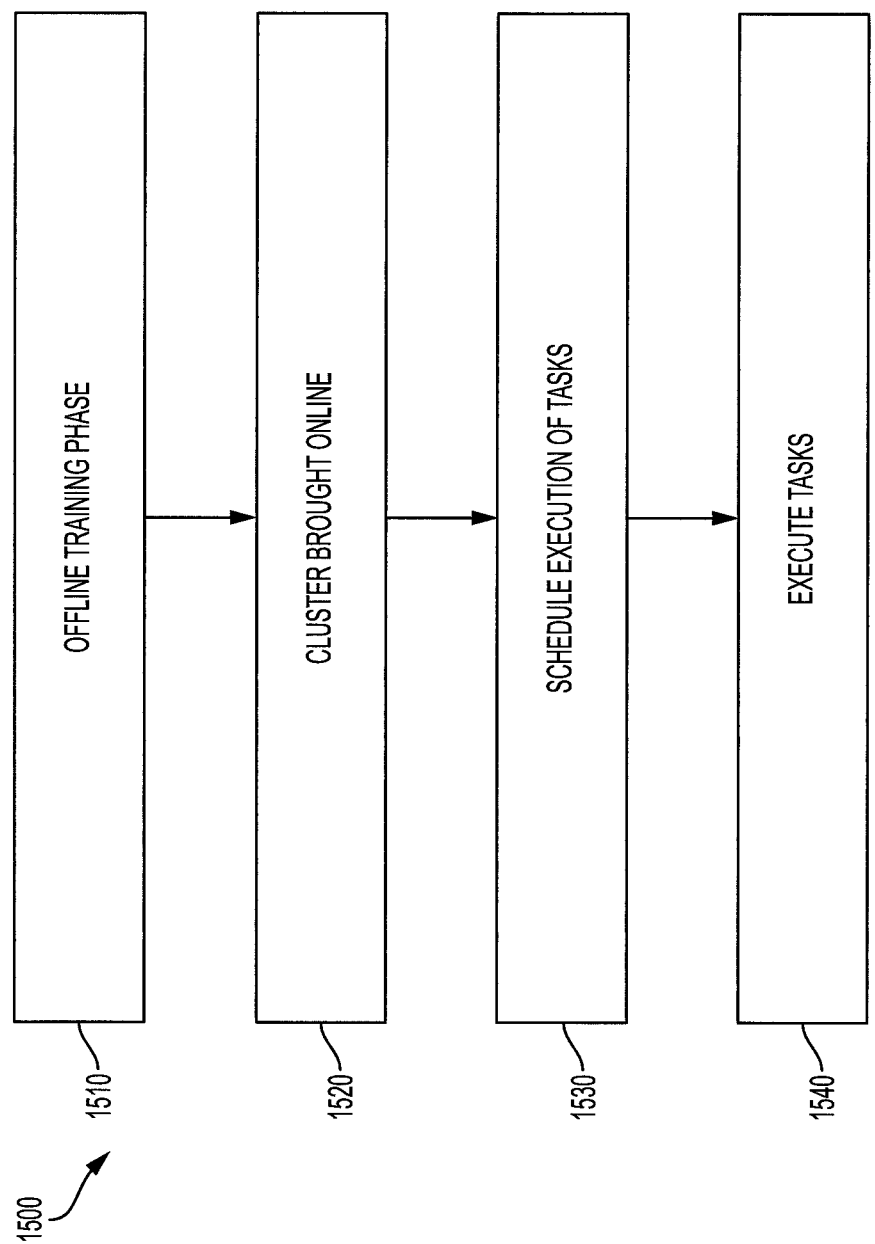
FIG. 15 is an exemplary flowchart.

Flowchart 1500 of FIG. 15 illustrates one embodiment. With reference thereto, in step 1510, during an offline training phase, a NameNode learns CPU and I/O bandwidth capabilities of nodes in a cluster. In step, 1520 the cluster is brought online. In step 1530, the NameNode schedules execution of tasks based on the learned CPU and I/O bandwidth capabilities. In step 1540, the tasks are executed.

Figure 16:
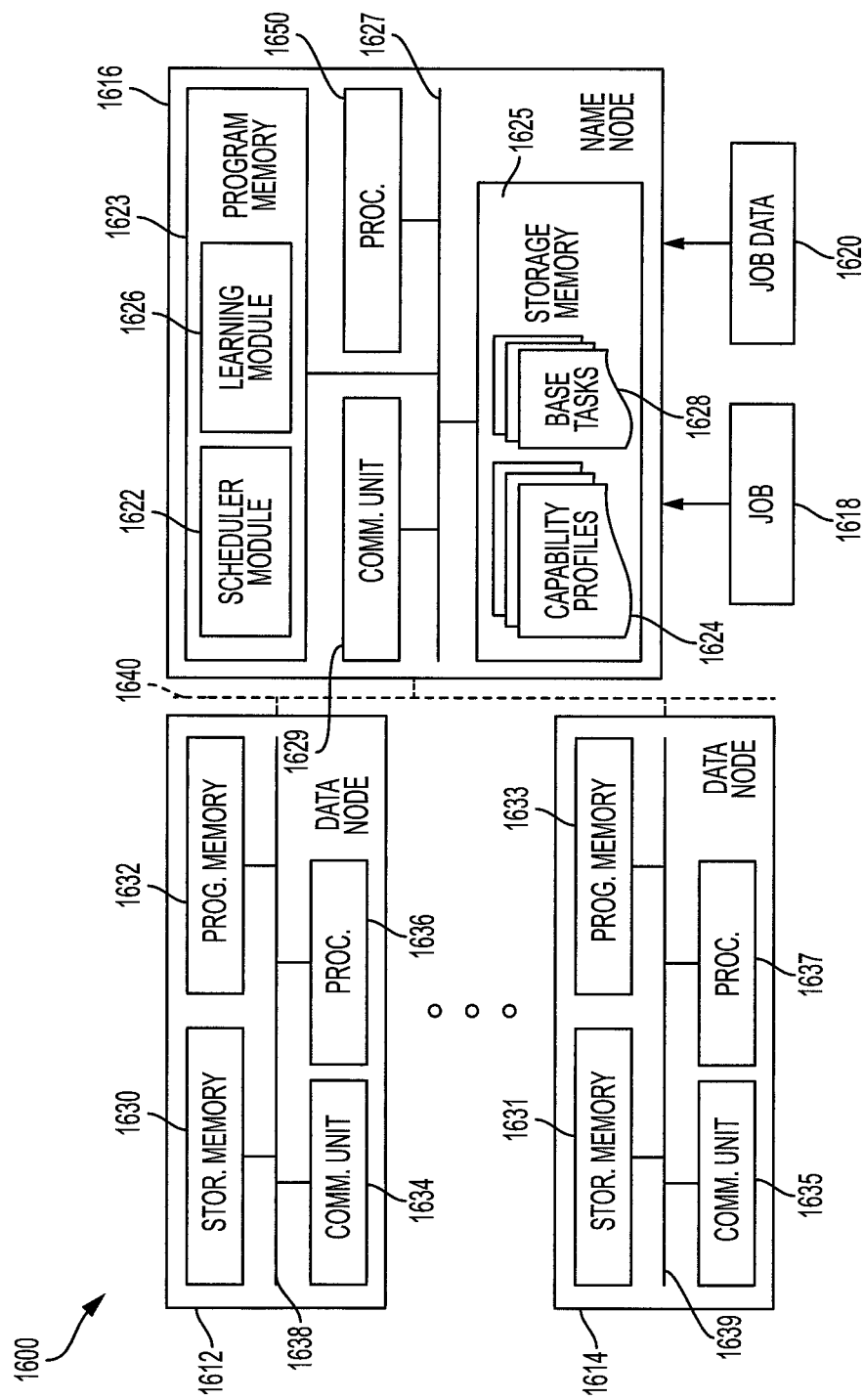
FIG. 16 illustrates a distributed compute system for executing data processing jobs.

Turning to FIG. 16, illustrated in accordance with the present concepts, a distributed compute system 1600 for executing data processing jobs is provided. The system 1600 includes a plurality of compute nodes 1612, 1614, 1616 (e.g., servers) interconnected by a communication network 1640. The compute nodes 1612, 1614, 1616 define a map-reduce cluster and include a name node 1616 and a plurality of data nodes 1612, 1614. Suitably, the compute nodes 1612, 1614, 1616 are heterogeneous in that the compute nodes 1612, 1614, 1616 include compute nodes with different capabilities (e.g., different disk I/O speed, CPU speed, memories etc.). Compute nodes 1612, 1614, 1616 may include storage memory(s) 1630, 1631, 1625 program memor(s) 1632, 1633, 1623 communication unit(s) 1634, 1635, 1629 one or more processors 1636, 1637, 1650 and bus(es) 1638, 1639, 1627.

The name node 1616 is configured to receive a job 1618 to be performed by the plurality of data nodes 1612, 1614 and job data 1620 to be processed through performance of the job 1618. The job 1618 and job data 1620 can be, for example, received remotely (e.g., over a communications network) or locally (e.g., from a program running on the name node 1616). The job 1618 is a program configured to work within the map-reduce framework of the system 1600. In that regard, the program can, for example, include map and reduce functions performed by the map and reduce tasks, respectively. Typically, the map and reduce functions operate at the level of a record or a line of text. The map function of the well-known WordCount program, for example, counts occurrences of words in lines of text.

The name node 1616 breaks the job data 1620 into blocks (e.g., 64 megabytes (MBs)), or otherwise receives the job data 1620 as blocks, and stores the blocks of the job data 1620. In some embodiments, the job data 1620 is stored in a distributed file system (e.g., a Hadoop Distributed File System (HDFS)) spanning the data nodes 1612, 1614. Further, in some embodiments, where the job data 1620 is stored in a distributed file system, each block is stored on a predetermined number (e.g., three) of the data nodes 1612, 1614. See, for example, FIG. 1.

Figure 2:
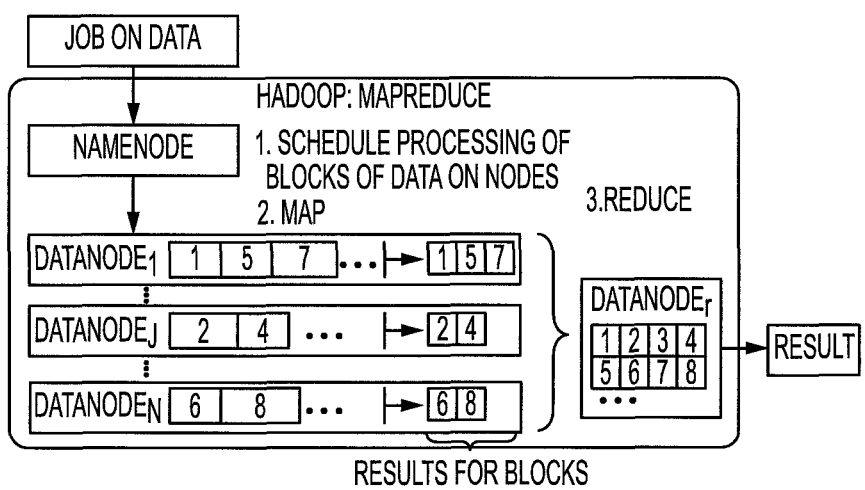
FIG. 2 illustrates an example implementation of a map-reduce framework known as HADOOP®.
Figure 3:
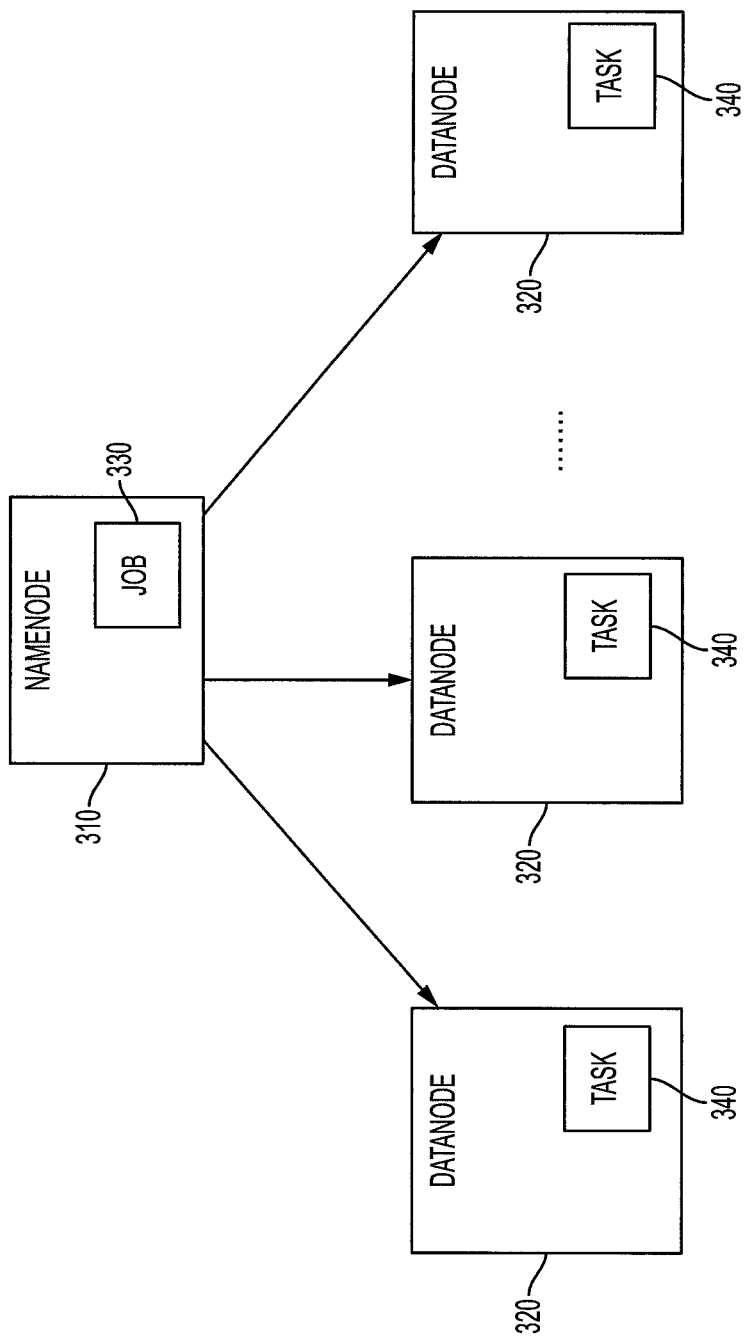
FIG. 3 illustrates an exemplary relationship between a NameNode and DataNodes.

The name node 1616 further breaks the job 1618 into a plurality of map and reduce tasks, or otherwise receives the job 1618 broken into map and reduce tasks, and schedules execution of the tasks on the data nodes 1612, 1614. See, for example, FIG. 2. Each map task operates on a different block of the job data 1620, where the map tasks of the job 1618 collectively operate on all of the blocks of the job data 1620. In some embodiments, where the job data 1620 is stored in a distributed file system, each map task is assigned to one of the data nodes 1612, 1614 storing its respective block. In this way, blocks will not to be transferred amongst the data nodes 1612, 1614. A map task processes a data block and generates a result for this block. A reduce task takes all these intermediate mapping results and combines them into the final result of the job 1618.

Among other components, name node 1616 includes communication unit 1629, one or more processors 1650, a program memory 1623, storage memory 1625, and bus 1627. To schedule the tasks of the job 1618 onto the data nodes 1612, 1614, the name node 1616 includes a scheduler module 1622 within a program memory 1623. The scheduler module 1622 generates a schedule for executing the tasks which accounts for heterogeneity in the cluster and maximizes overall job throughput. This requires the scheduler module 1622 to track available resources, which can be determined based on capability profiles 1624 of the data nodes 1612, 1614 stored in storage memory 1625. Namely, available resources can be determined by tracking those data nodes which are not being used and using the corresponding capability profiles.

The capability profiles 1624 of the data nodes 1612, 1614 are determined before using the data nodes 1612, 1614 in production using a learning module 1626 of program memory 1623. For example, before using the cluster, the capability profiles of all the data nodes in the cluster are determined. Thereafter, capability profiles are determined as needed as new data nodes are added to the cluster. The capability profile of a data node describes the capability of the data node. For example, the capability profile of a data node describes one or more of the CPU, memory, disk storage, software configuration, and the like of the data node.

The capability profiles 1624 can be manually or automatically generated. Automatic generation is suitably performed using the learning module 1626. Assumptions of availability of the following may possibly be made: 1) timing information from task executions for the data nodes 1612, 1614; 2) a set of base tasks 1628 with various, known resource requirements (e.g., requirements pertaining to one or more of the CPU, memory, disk storage, software configuration, and the like); and 3) control over the scheduling of tasks onto the compute nodes 1612, 1614. Timing information for task executions includes the amount of time to complete each task execution (i.e., execution of task on a data node).

Advantageously, the systems and methods described herein improve the technical functioning of a cluster of compute nodes. For example, the systems and methods described herein more efficiently allocate tasks among compute nodes, allowing more efficient use of processors and memory on the compute nodes. This increases throughput, decreases overall job completion time, reduces the processing burden on certain processors, reduces the memory burden on certain memory storage devices, and so forth.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A system for scheduling jobs, said system comprising:
a plurality of interconnected compute nodes defining a cluster of compute nodes, the cluster including a NameNode and a multitude of DataNodes;
the NameNode including at least one processor programmed to:
learn central processing unit (CPU) capabilities and disk input/output (I/O) bandwidth capabilities of compute nodes in the cluster; and
schedule execution of a plurality of tasks on compute nodes of the cluster based on the learned CPU capabilities and I/O bandwidth capabilities of compute nodes of the cluster; and
wherein the system further includes an optimal number of containers determined for compute nodes in the cluster;
wherein the scheduling is further based on the determined optimal number of containers; and
wherein the optimal number of containers is at least in part determined by use of the equation:

$$X_k^* = \underset{x_k}{\operatorname{argmax}} \sum_i \frac{x_{ki}}{\rho(\theta^j, \pi^k, L^k)}$$

where $X_k^*$ denotes a vector of containers, $\rho$ denotes a predicted task completion time, $\theta^j$ denotes a resource requirement, $\pi^k$ denotes a resource capability, and $L^k$ denotes a load on a node.

2. The system of claim 1, wherein the learning is performed during an offline training phase.

3. The system of claim 2, wherein the learning is completed before bringing the cluster online.

4. The system of claim 1, wherein:
the execution of a plurality of tasks is scheduled such that a throughput of the cluster is increased; and
the throughput is determined based on sizes of tasks of the plurality of tasks.

5. A method for scheduling jobs in a cluster of compute nodes including a NameNode and a multitude of DataNodes, said method comprising:
learning central processing unit (CPU) capabilities and disk input/output (I/O) bandwidth capabilities of compute nodes in the cluster;
scheduling execution of a plurality of tasks on compute nodes of the cluster based on the learned CPU capabilities and I/O bandwidth capabilities of compute nodes of the cluster;
determining an optimal number of containers for compute nodes in the cluster;
wherein the scheduling is further based on the determined optimal number of containers; and
wherein the optimal number of containers is at least in part determined by use of the equation:

$$X_k^* = \underset{x_k}{\operatorname{argmax}} \sum_i \frac{x_{ki}}{\rho(\theta^j, \pi^k, L^k)}$$

where $X_k^*$ denotes a vector of containers, $\rho$ denotes a predicted task completion time, $\theta^j$ denotes a resource requirement, $\pi^k$ denotes a resource capability, and $L^k$ denotes a load on a node.

6. The method of claim 5, wherein the learning is performed during an offline training phase.

7. The method of claim 6, wherein the learning is completed before bringing the cluster online.

8. The method of claim 5, wherein:
the execution of a plurality of tasks is scheduled such that a throughput of the cluster is increased; and the throughput is determined based on sizes of tasks of the plurality of tasks.

9. A system for scheduling jobs, said system comprising:
a plurality of interconnected compute nodes defining a cluster of compute nodes, the cluster including a NameNode and a multitude of DataNodes;
at least one processor programmed to:
  predict a relative resource usage of map tasks by observing a resource usage of a first map task;
  automatically train an adjustable system of task completion time;
  learn central processing unit (CPU) capabilities and disk input/output (I/O) bandwidth capabilities of compute nodes in the cluster; and
  schedule execution of a plurality of tasks on compute nodes of the cluster based on the learned CPU capabilities and I/O bandwidth capabilities of compute nodes of the cluster; and
wherein the system further includes an optimal number of containers determined for compute nodes in the cluster;
wherein the scheduling is further based on the determined optimal number of containers; and
wherein the optimal number of containers is at least in part determined by use of the equation:

$$X_k^* = \underset{x_k}{\operatorname{argmax}} \sum_i \frac{x_{ki}}{\rho(\theta^j, \pi^k, L^k)}$$

where $X_k^*$ denotes a vector of containers, $\rho$ denotes a predicted task completion time, $\theta^j$ denotes a resource requirement, $\pi^k$ denotes a resource capability, and $L^k$ denotes a load on a node.

10. The system of claim 9, wherein the learning is performed during an offline training phase.

11. The system of claim 10, wherein the learning is completed before bringing the cluster online.

12. The system of claim 9, wherein:
the execution of a plurality of tasks is scheduled such that a throughput of the cluster is increased; and
the throughput is determined based on sizes of tasks of the plurality of tasks.

* * * * *